(12) United States Patent
Russell

(10) Patent No.: US 7,441,640 B2
(45) Date of Patent: Oct. 28, 2008

(54) SHOCK ABSORBER APPARATUS

(76) Inventor: Peter Russell, 6911 E. 9th Ave., Spokane, WA (US) 99212

( * ) Notice: Subject to any disclaimer, the term of this patent is extended or adjusted under 35 U.S.C. 154(b) by 41 days.

(21) Appl. No.: 10/961,511

(22) Filed: Oct. 7, 2004

(65) Prior Publication Data

US 2005/0077131 A1 Apr. 14, 2005

Related U.S. Application Data

(60) Provisional application No. 60/509,833, filed on Oct. 8, 2003, provisional application No. 60/537,429, filed on Jan. 15, 2004.

(51) Int. Cl.
*F16F 9/34* (2006.01)
*F16F 9/48* (2006.01)
(52) U.S. Cl. ............... 188/322.15; 188/319.2; 188/289; 267/64.11
(58) Field of Classification Search ............ 188/289, 188/322.13, 322.15, 322.22, 316–318, 319.2; 267/64.11, 64.18, 64.22; 137/493.3, 493.6
See application file for complete search history.

(56) References Cited

U.S. PATENT DOCUMENTS

| | | | | |
|---|---|---|---|---|
| 2,596,982 | A * | 5/1952 | Chisholm, Jr. ........... | 137/493.5 |
| 4,153,237 | A | 5/1979 | Supalla | |
| 4,671,392 | A | 6/1987 | Wossner | |
| 4,934,749 | A | 6/1990 | Folarin | |
| 4,936,424 | A | 6/1990 | Costa | |
| 5,810,128 | A | 9/1998 | Eriksson et al. | |
| 5,971,117 | A * | 10/1999 | Grundei et al. ............ | 188/288 |
| 5,988,330 | A | 11/1999 | Morris | |
| 6,029,958 | A | 2/2000 | Larsson et al. | |
| 6,116,388 | A | 9/2000 | Bataille et al. | |
| D431,802 | S | 10/2000 | Sintorn et al. | |
| 6,220,409 | B1 | 4/2001 | Deferme | |
| 6,286,642 | B1 * | 9/2001 | Yi ........................... | 188/319.2 |
| 6,340,081 | B1 | 1/2002 | Keil | |
| 6,446,771 | B1 | 9/2002 | Sintorn et al. | |
| 6,592,136 | B2 | 7/2003 | Becker et al. | |
| 6,604,751 | B2 | 8/2003 | Fox | |
| 6,640,943 | B1 | 11/2003 | Daws et al. | |

\* cited by examiner

*Primary Examiner*—Melody M Burch
(74) *Attorney, Agent, or Firm*—Mark A. Bauman

(57) ABSTRACT

A shock absorber includes a first cylinder having a first fluid port and a second cylinder having a second fluid port. A response adjustment mechanism is connected in fluid transmission relation between the first and second fluid ports.

The response adjustment mechanism includes three adjustable valves for controlling the operation of the shock absorber. One of the adjustable valves has a stem that is rotatable by a tool during operation. The remaining adjustable valves each have a shaft that is rotatable by a tool during operation.

The adjustable valves of the response adjustment mechanism are coaxially positioned so that a first valve is coaxially positioned within a second valve, and the first and second valves are coaxially positioned within a third valve.

25 Claims, 24 Drawing Sheets

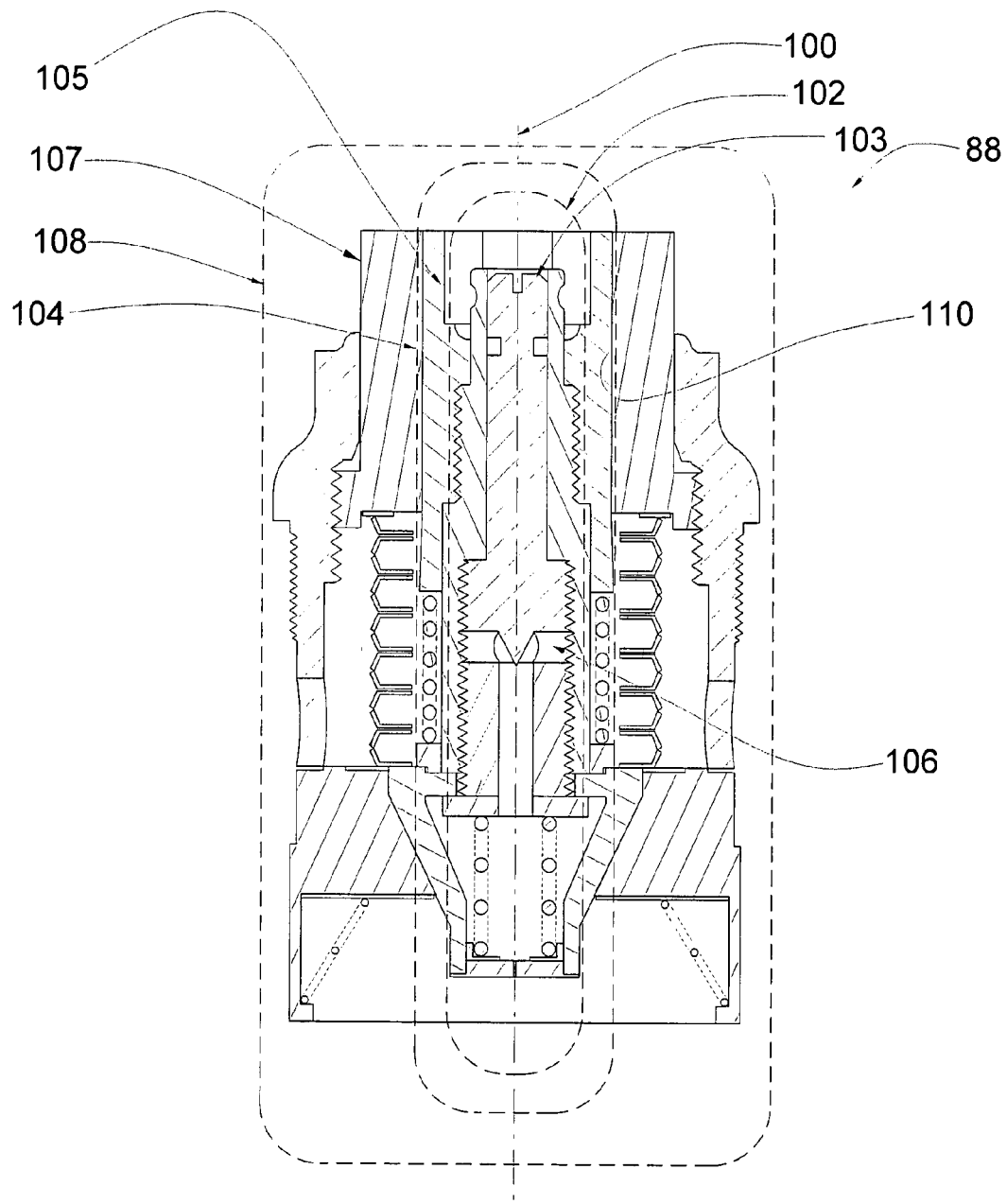
FIG. 9
(AMENDED)

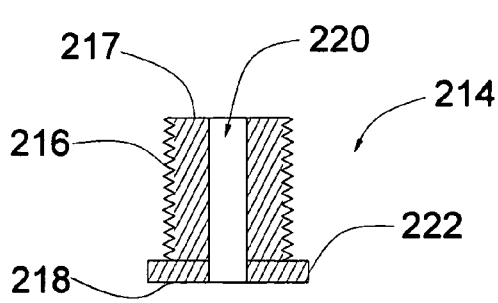
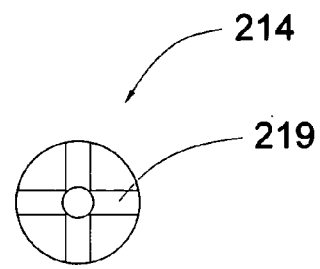
FIG. 16  FIG. 17
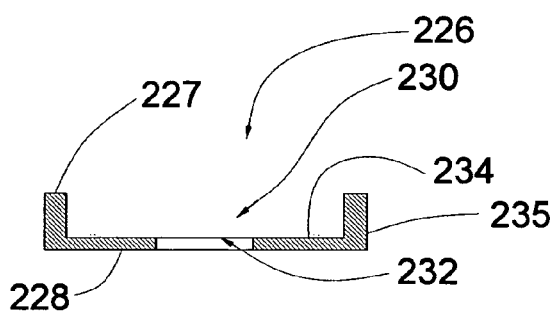
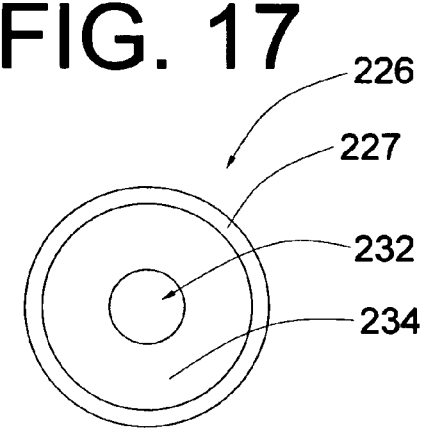
FIG. 18  FIG. 19
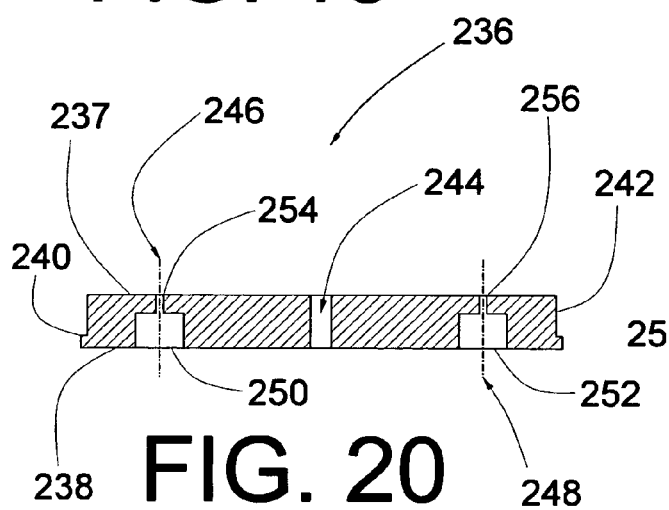
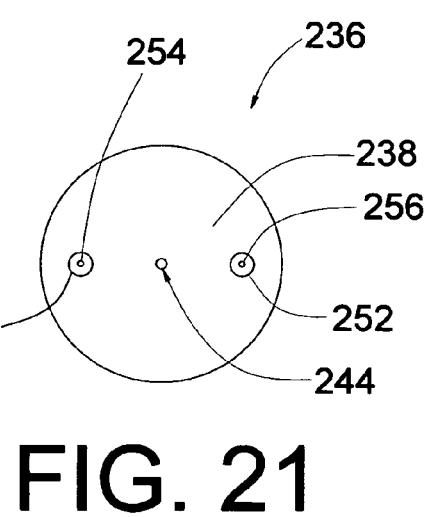
FIG. 20  FIG. 21

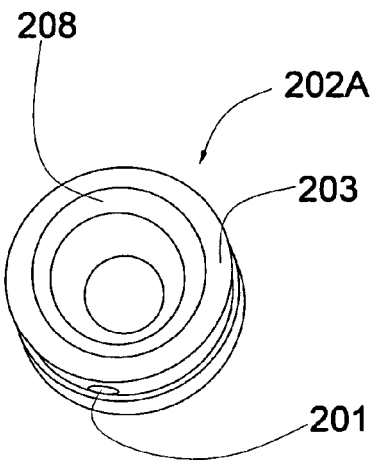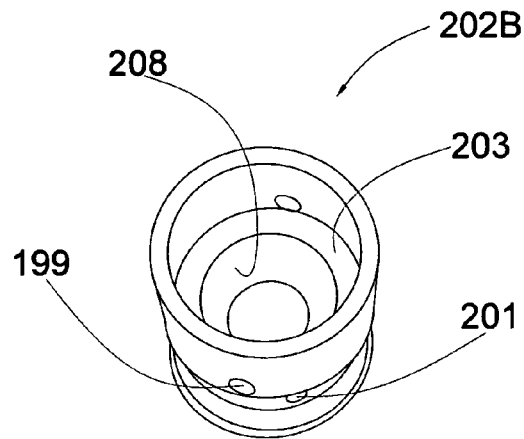
FIG. 22A   FIG. 22B
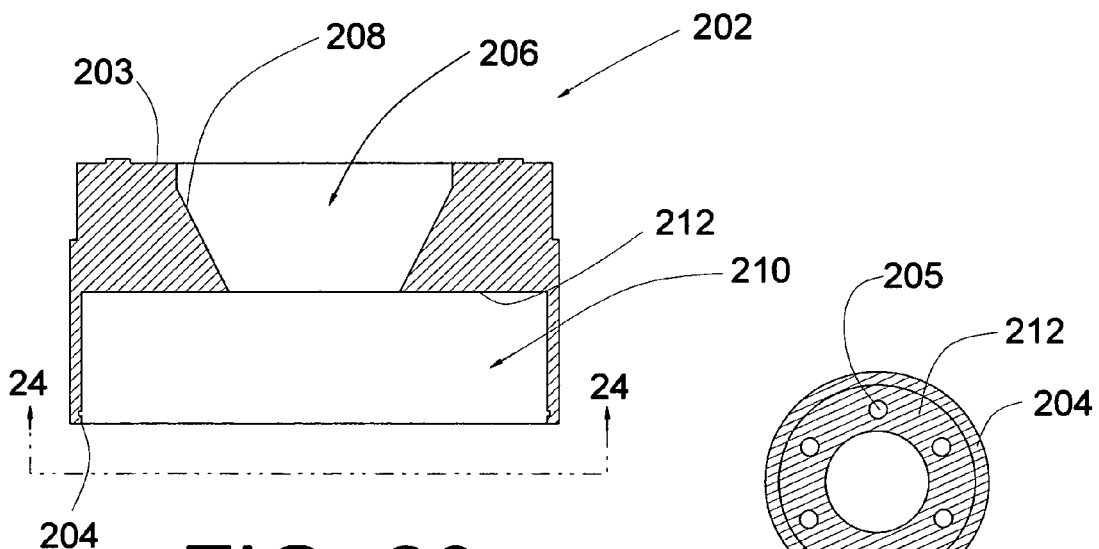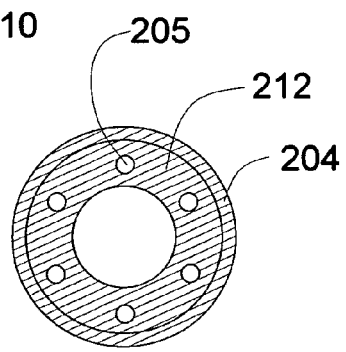
FIG. 23   FIG. 24

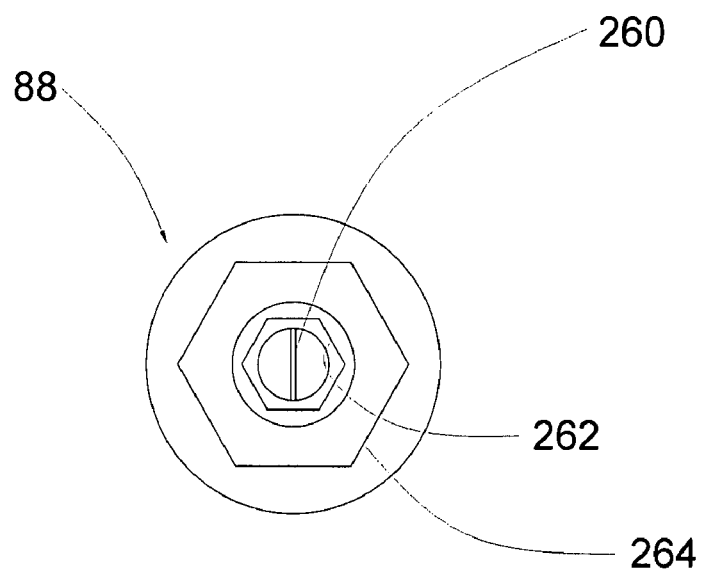
FIG. 30
(AMENDED)

SHOCK ABSORBER APPARATUS

CROSS REFERENCE TO RELATED APPLICATIONS

This application relates to and claims priority to U.S. Provisional Application 60/509,833 filed on Oct. 8, 2003 and claims priority to U.S. Provisional Application 60/537,429 filed on Jan. 15, 2004.

BACKGROUND OF THE INVENTION

1. Field of the Invention

This invention relates to a shock absorber, and more particularly to a shock absorber incorporating improved dampening response mechanisms and more specifically to a shock absorber having a versatile adjustable response mechanism for tuning the performance of the shock absorber apparatus.

2. Description of Related Art

Shock absorber systems have been in use for damping the reaction forces experienced with wheeled vehicles throughout the use of the wheel as a means of transport. Shock absorbers are well known in the art and have been used successfully for many years to improve the safety and handling of many types of vehicles. The design of the shock absorber has often been challenging due to the nature of the dynamic motion of a vehicle as it travels over widely varying terrain and driving conditions. Shock absorber performance, though improved over the last few decades, is still far from optimum. Often, the constraints and criteria used in the design of a shock absorber are counter to one another, and force the designer to balance tradeoffs. The result is a shock absorber having performance that often delivers compromising results.

In certain applications, shock absorber systems are taken to extremes, providing even further challenges for the designer. For example, in the field of off-road motorcycle racing, a shock absorber is exposed to widely varying conditions as the vehicle is raced along a course of travel. Furthermore, the performance of the shock absorber system can make a dramatic impact on the safety and performance of the motorcycle.

For optimum performance, the response of a shock absorber often must be tuned or adjusted for the conditions in which it will be used. However, many shock absorber systems available on the market today have a limited tuning capability. Further, those with an adjusting or tuning capability, are often difficult to adjust, resulting in mal-adjustments of the shock absorber which degrades the performance even further.

The motorcycle shock absorber is relied upon by riders to provide comfort and stability as well as to enhance the performance of the motorcycle. One of the preferences of riders over rough and varied terrain, is to have the responsive handling while preventing the bone jarring jolts to the rider created when the motorcycle impacts into bumps on the terrain. In the motorcycle application, the shock absorber must provide a steady and consistent ride over flat terrain. The flat terrain will not create instantaneous jarring reaction forces. The shock absorber will react to the flat terrain with low speed control. The piston in the cylinder of the shock absorber will translate in the cylinder at a low speed. The shock absorber is required to provide a steady and consistent ride over moderate terrain. The moderate terrain will create moderate reaction forces that cause the shock absorber to translate at a mid or medium speed. It is desirable for a shock absorber to have mid or medium speed control for the moderate terrain where the shock absorber is required to absorb occasional jolts while maintaining a stiff response over the moderate terrain. In addition, the shock absorber is required to provide a stable and consistent ride over rough and choppy terrain. The rough and choppy terrain will cause instantaneous jarring reaction forces on the shock absorber. The shock absorber will react to the rough and choppy terrain with high speed translation. The shock absorber needs high speed control for the high speed translation. The shock absorber is required to dampen the sudden impact forces without a hard stiff jolt. Unfortunately, up to this point, it has been difficult to realize a shock absorber, having a suitable response for the varying types of terrain cited above.

There have been many attempts to some of these problems with varying degrees of success. For example, U.S. Pat. No. 5,810,128 teaches an improved shock absorber having an improved transition between a first and second damping rates. Yet further, U.S. Pat. No. 6,446,771 provides an improved bleed function and non-return valve arrangement. And further, U.S. Pat. No. 6,116,338 teaches an improved compression stroke valve in an attempt to improve the performance of a shock absorber system.

Several attempts have been made to overcome the deficiencies found in the state-of-the-art shock absorbers by designing support systems which reduce the effects of the inherent deficiencies in state-of-the-art shock absorbers. For example, linkage systems have been incorporated on vehicles to modify the motion experienced by the shock absorber to better match it the vehicle system. Unfortunately, while such attempts improve the performance, they also add cost and weight to the vehicle.

Therefore, it is evident that a versatile and adjustable shock absorber is needed to overcome these and other deficiencies in the prior art. The subject invention for a shock absorber apparatus overcomes the perceived shortcomings and detriments in the prior art apparatuses and is the subject matter of the present application.

SUMMARY OF THE INVENTION

A first aspect of the present invention relates to a shock absorber apparatus, having a first cylinder defining a first internal bore closed by a first end wall and an opposite second end wall, and further has a first port connected in fluid transmission relation to the first internal bore, and a second cylinder defining a second internal bore closed by a first end wall and an opposite second end wall, and a second port connected in fluid transmission relation to the second internal bore, and a response adjustment mechanism located adjacent to the second cylinder, and connected in fluid transmission relation between the first port and second port, and has three or more adjustment operators which are operable to direct the fluid flow between the first port and the second port.

Another aspect of the present invention relates to a shock absorber apparatus, having a first cylinder defining a first internal bore and having an internal diameter, and closed by a first end wall, and further closed by an opposite second end wall, and further having a first port connected in fluid transmission relation to the first internal bore, and a rod having a first end and an opposite second end, and wherein the rod movably extends into the first internal bore through an aperture formed in the first end wall so that the second end of the rod is positioned concentrically within the first internal bore, and so that the first end of the rod is positioned outside the first internal bore, and a first piston fixedly attached to the rod at an intermediate position located between the first and the second end of the rod, and positioned concentrically within the first cylinder, and a second piston fixedly attached to the rod proximate to the second end of the rod, and positioned concentrically within the first cylinder; a second cylinder defining a second internal bore closed by a first end wall and an opposite second end wall, and having a second port connected in fluid transmission relation to the second internal bore, and having and a response adjustment mechanism located adjacent to the second cylinder, and connected in fluid transmission relation between the first cylinder port and the second cylinder port, and wherein the response adjustment mechanism is configured to provide three or more adjustments for tuning the response of the shock absorber system.

Still further, another aspect of the present invention relates to a shock absorber apparatus, having a housing comprising a first internal bore having a diameter, and further comprising a second internal bore having a diameter, and wherein the housing is closed by a first end wall, and further closed by an opposite second end wall, and a rod having a first end and an opposite second end, and wherein the rod movably extends into the first and/or second internal bore through an aperture formed in the first end wall so that the second end of the rod is positioned concentrically within the first internal bore or second internal bore, and so that the first end of the rod is positioned outside the housing, and a first piston having a diameter, and fixedly attached to the rod at an intermediate position located between the first and the second end of the rod, and positioned within the first internal bore in sliding relation, and a second piston, having a diameter, and fixedly attached to the rod proximate to the second end of the rod, and positioned within the first and/or the second internal bore in sliding relation, and wherein the diameter of the first piston is approximately equal to the diameter of the first internal bore, and wherein the diameter of the second piston is approximately equal to the diameter of the second internal bore, and further wherein the diameter of the second piston is less than the diameter of the first piston.

And still further, another aspect of the invention relates to a shock absorber apparatus, having a first cylinder bore having a diameter and having a longitudinal axis, and filled with an incompressible fluid, and having a second cylinder bore having a diameter, and filled with the incompressible fluid, and positioned adjacent to the first cylinder bore, and along the longitudinal axis of the first cylinder bore, and having a piston rod having a first end, and an opposite second end, and a longitudinal axis, and an external surface, and wherein the first end is positioned outside the first and second cylinder bore, and wherein the second end is positioned within the first or the second cylinder bore, and the longitudinal axis of the piston rod is positioned concentric to, and along, the longitudinal axis of the first cylinder bore, the piston rod further comprising a bore formed concentrically therein, and wherein the piston rod further comprises a one or more of apertures formed within the piston rod and extending from the external surface of the piston rod into the bore of the piston rod to form a fluid passage, and having a first piston positioned at an intermediate position located between the first and the second end of the piston rod, and configured to translate within the first cylinder bore in response to an external force, and having a second piston positioned proximate to the second end of the piston rod, and configured to translate within the first cylinder bore, and in the second cylinder bore, and in response to the external force, and a needle assembly located substantially within the second cylinder bore, and configured to enter the bore of the piston rod as the second piston nears the second cylinder bore, and wherein the diameter of the second cylinder bore is less than the diameter of the first cylinder bore.

Yet further, another aspect of the invention relates to a shock absorber apparatus, having a housing, and a cylinder bore enclosed by the housing, and further having a longitudinal axis, and a rod substantially positioned concentric to, and along, the longitudinal axis of the cylinder bore, and partially positioned within the cylinder bore; a piston fastened to the rod, and slidingly positioned within the cylinder bore, and a pressure plate slidingly positioned on the rod, and positioned adjacent to the piston, and a plate spring retainingly mounted to the pressure plate.

And another aspect of the invention relates to a shock absorber apparatus having a housing, and a cylinder bore enclosed by the housing, and having a longitudinal axis, and a rod having a first end and an opposite second end, and wherein the rod is substantially positioned concentric to, and along, the longitudinal axis of the cylinder bore, and wherein the first end of the rod is positioned within the cylinder bore, and a piston fastened concentrically to the rod, and movably positioned within the cylinder bore, and a step washer positioned concentrically around the rod in stacking relation, and positioned proximate to the piston, and a pressure plate positioned concentrically around the step washer in sliding relation, and a plate spring positioned concentrically around the rod so that it is borne by the step washer, and further wherein a portion of the plate spring is held in tension by the pressure plate.

BRIEF DESCRIPTION OF THE DRAWINGS

Preferred embodiments of the invention are described below with reference to the following accompanying drawings.

FIG. 9 is a simplified cross-sectional view of a response adjustment mechanism with a general border shown for three of the adjustment valves.

FIG. 16 is a cross-sectional view of a screw in the response adjustment mechanism.

FIG. 17 is a bottom view of the screw in the response adjustment mechanism.

FIG. 18 is a cross-sectional view of a disc in the response adjustment mechanism.

FIG. 19 is a plan view of the disc in the response adjustment mechanism.

FIG. 20 is a cross-sectional view of a plate in the response adjustment mechanism.

FIG. 21 is a bottom view of the plate in the response adjustment mechanism.

FIG. 22A is a perspective view of a first type of a third base in the response adjustment mechanism.

FIG. 22B is a perspective view of a second type of the third base in the response adjustment mechanism.

FIG. 23 is a cross-sectional view of the second type of the third base in the response adjustment mechanism.

FIG. 24 is a bottom view of the third base in the response adjustment mechanism.

FIG. 30 is a partial plan view of the response adjustment mechanism.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
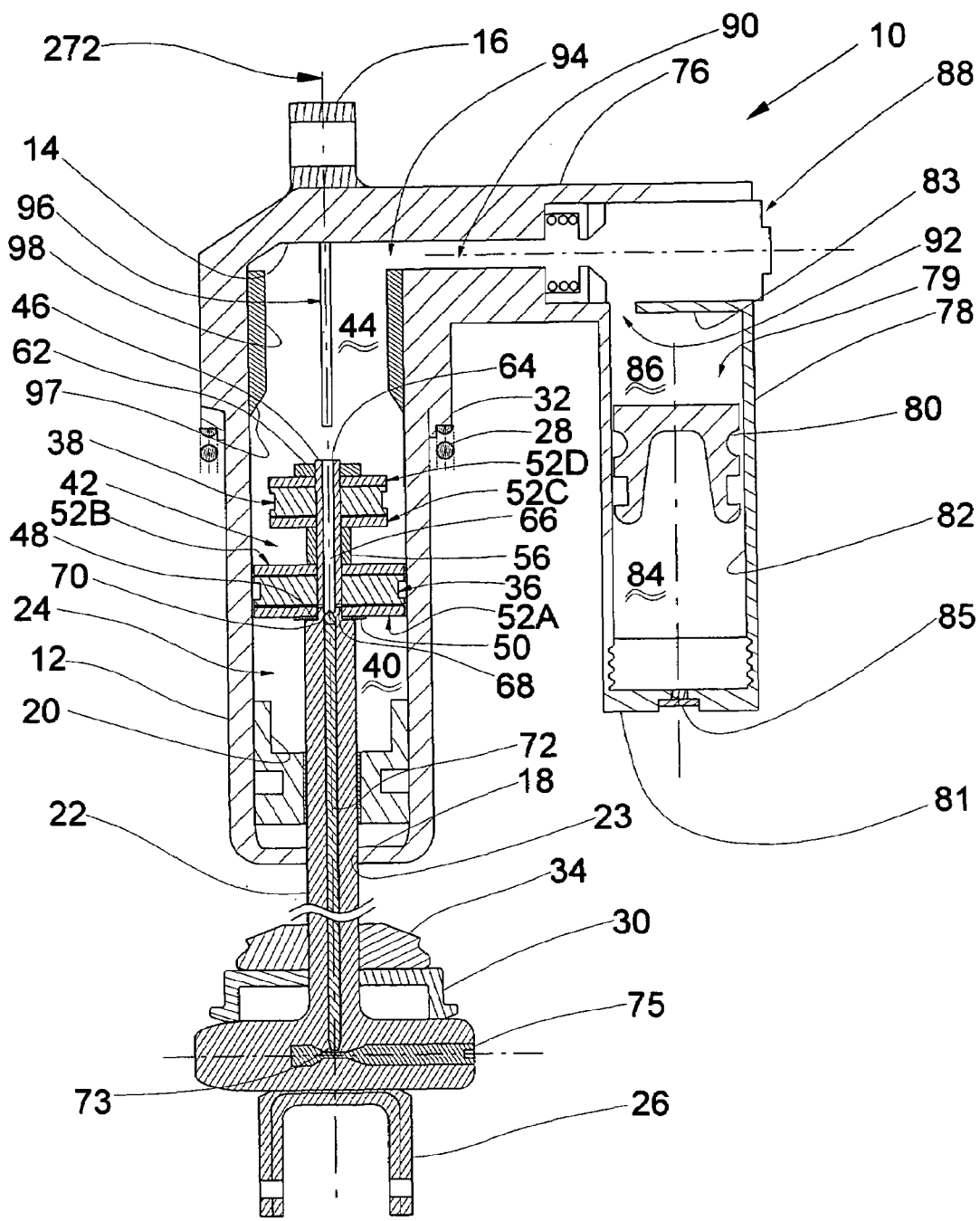
FIG. 1 is a simplified cross-sectional view of a shock absorber apparatus showing some of the features of the present invention.

Referring to FIG. 1, an exemplary shock absorber constructed in accordance with an embodiment of the invention is identified generally by the reference numeral 10. The shock absorber 10 is designed to be positioned between a vehicle chassis (not shown), and a wheel-carrying hub (not shown) in a manner known in the art. The suspension unit 10 includes a cylinder assembly or housing 12 which is provided with a first end wall or cap 14. The end wall 14 carries a bracket 16 so as to provide a pivotal connection to the vehicle chassis (not shown).

The cylinder housing 12 having a longitudinal axis 272 includes a cylinder bore 24 that is closed at one end by the end wall 14 and at the other end by the gland 20. The opposite end of the cylinder housing 12 is enclosed by an end wall or cap 18 that carries a sealing gland 20. A piston rod 22 extends through the sealing gland 20 out of an aperture 23 formed in the wall 18 in a sealing arrangement while providing a translational guide for the rod 22 to allow the rod 22 to translate within the cylinder housing 12. The rod 22 has an elongated portion on which is carried a yoke 26 that provides the connection to the wheel-carrying hub (not shown).

A coil compression spring 28 encircles the cylinder housing 12 and the exposed end external to the housing 12 of the piston rod 22. One end of this spring 28 rests against a collar 32 that is connected to the cylinder housing 12. The opposite end of the spring 28 rests against a spring retainer 30 that is carried by the piston rod 22 and is adjacent to the yoke 26. In this arrangement, the spring 28 will be loaded as the piston rod 22 moves relative to the cylinder housing 12 upon suspension movement of the wheel or hub relative to the chassis of the vehicle. A snubber 34 is carried by the spring retainer 30 and will engage with the end cap 18 so as to provide a cushioned, yet positive stop, providing a limit to the total compression of the shock absorber 10.

Referring still to FIG. 1, the shock absorber 10 is comprised of a first damping piston 36 and a second damping piston 38 having a reduced diameter. Each piston 36 and 38 are supported on the piston rod 22 within the cylinder bore 24. The second damping piston 38 approximately defines a first fluid chamber 44 between the piston 38 and the end wall 14. A second fluid chamber 42 is approximately defined between the two pistons 36 and 38 and a third fluid chamber 40 is approximately defined between the first fluid piston 36 and the gland 20. The fluid chambers 40, 42, and 44 are filled with a damping fluid such as hydraulic fluid.

The piston rod 22 has a reduced diameter portion generally indicated by the numeral 46 which extends from a first end of the rod 22 to a shoulder 48. This reduced diameter portion 46 is configured to mount and translate in stacking arrangement the components that assist in providing a variable response to external forces. A washer 50 is positioned in resting relation to the shoulder 70. A damping valve assembly 52A is positioned over the reduced diameter portion 46 of the rod 22 adjacent to the washer 50. The first piston 36 is positioned adjacent to the damping valve assembly 52A. Another damping valve assembly 52B is positioned adjacent to the first piston 36. A spacing sleeve 56 is positioned adjacent to the damping valve assembly 54B and is configured to maintain a spatial distance between the two pistons 36 and 38. The spacing sleeve 56 has an axial length which can be selected so as to control the spacing between the pistons 36 and 38. Another damping valve assembly 52C is positioned adjacent to the spacing sleeve 56. The second piston 38 is positioned adjacent to the damping valve assembly 52C. Another damping valve assembly is positioned adjacent to the second piston 52D. A holding nut 62 is positioned in a threaded arrangement onto the reduced diameter portion 46 of the rod 22 and, when tightened appropriately, provides a holding force to maintain a spatial relationship between the first and second pistons 36 and 38. The damping valves 52A, 52B, 52C, and 52D may be similarly constructed, one to another, but may vary in scale or in characteristics. Alternatively, the damping valves 52A, 52B, 52C, and 52D may be constructed using differing elements from each other, and constituting different styles of damping valves.

The piston 36 is formed with damping flow passages (not shown) which extend therethrough and will be discussed later. The damping valve assembly 52A is interposed between the spacer plate 50 and the piston 36 and partially controls the flow from the chamber 42 to the chamber 40. The damping valve assembly 52B is interposed between the opposite side of piston 36 and the spacer sleeve 56 received on the reduced diameter portion 46 of the piston rod 22. The valve assembly 52B acts to partially control the flow from the chamber 40 to the chamber 42.

Like the piston 36, the piston 38 has a series of flow passages (not shown) that extend therethrough. Some of the flow in a first direction from the chamber 44 to the chamber 42 occurs through certain of these passages at a rate controlled by the damping valve assembly 52D depending on the position of the second piston 38. Flow from the chamber 42 to the chamber 44 is partially controlled by the damping valve assembly 52C which is disposed on the opposite side of the piston 36.

A further control damping arrangement may be incorporated so as to provide further control of the damping rate. The end 64 of the piston rod 22 that extends into the chamber 44 is provided with a central bore 66. This central bore 66 extends generally to the area where the shoulder 48 is formed. An orifice plate 68 is provided that is at least partially closed by an adjustable metering pin 70. The position of the metering pin 70 is controlled by an adjusting rod 72 that extends through a further bore formed in the rod 22. The opposite end of the adjustment rod 72 has a rounded pin 73 attached thereto, and is positioned in force transmission relation to a rebound adjustment screw 75. This adjustment screw 75 permits external adjustment of the damping flow through the orifice plate 68 controlled by the metering pin 70.

Still referring to FIG. 1, an arm 76 extends from the cylinder housing 12 to an accumulator housing 78. The housing 78 has a first end wall 81 and a second end wall 83. A fluid passage 90 extends within and through the arm 76 to a first port 94 in fluid communication with the chamber 44. A response adjustment mechanism 88 is positioned in fluid communication with the fluid passage 90. The response adjustment mechanism 88 is positioned in fluid communication with a second port 92 which is positioned adjacent to the accumulator housing 78 as will be discussed below. The response adjustment mechanism 88 is configured to provide a user specified variable adjustment to affect the damping characteristics of the shock absorber 10. The response adjustment mechanism 88 includes biasing members for controlling the response of the shock absorber apparatus 10 by providing a user adjustment for a plurality of speed ranges. The mechanism 88 can include at least one of a low speed adjustment portion, a medium speed adjustment portion, and a high speed adjustment portion. The low speed adjustment portion of the mechanism 88 can include a needle flow controller. The medium speed adjustment portion can include biasing members configured to control damping fluid flow as a function of the user adjustment and the pressure difference between the ports 94 and 92. The high speed adjustment portion can include high resistance biasing members configured to control damping fluid flow as a function of the user adjustment and the pressure difference between the ports 94 and 92. The construction and operation of the mechanism 88 will be discussed in detail at a later point in this specification.

A floating piston 80 is contained within a bore 82 of the accumulator chamber 78. An inert gas such as nitrogen may fill a chamber 84 formed on one side of the floating piston 80 so as to maintain a fluid pressure on the fluid in the shock absorber chambers 40, 42, 44 and in a chamber 86 formed on the head of the floating piston 80. The inert gas may be inserted through charging port 85 through the base of the accumulator 78.

The effective inside diameter of the cylinder bore 24 can be reduced over a portion of its length to provide for an enhanced dampening characteristic as the piston 38 approaches the wall 14. In FIG. 1, a cylindrical insert or sleeve 98 shown as it is mounted to the internal surface of the bore 24 of the cylinder housing 12 proximate to the wall 14. The sleeve 98 may include a taper 97 to provide a gradual transition to the flow of fluid as the piston 38 approaches. The shape of the taper 97 may be selected to tayler the transition to provide a desirable damping characteristic as the piston 38 approaches and travels through the bore defined by the sleeve 98.

Yet further, to enhance the damping characteristics of the shock absorber apparatus 10, a needle assembly indicated generally by the reference numeral 96 is mounted proximate to the end cap 14. The needle assembly 96 is adapted to enter into the piston rod bore 66 and provide additional control therethrough as will be discussed in greater detail below.

Figure 2:
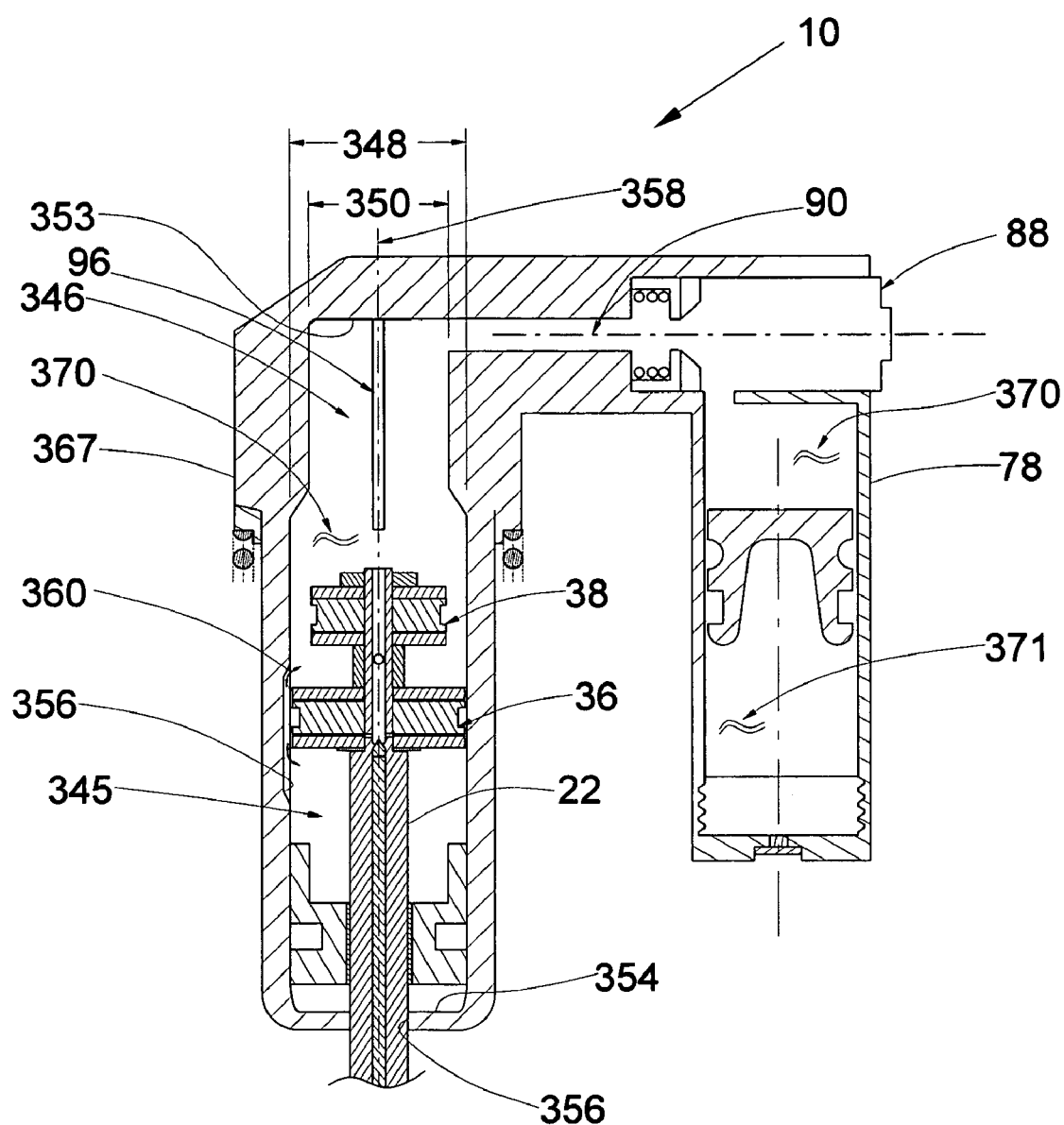
FIG. 2 is a simplified cross-sectional view of a variation of the shock absorber apparatus.

Referring now to FIG. 2, a variation of the shock absorber apparatus 10 is shown. In this variation, the shape and form of the sleeve 98 shown in FIG. 1 is incorporated into the cylinder or housing 367. The housing 367 defines a first cylinder bore of 345 concentrically aligned along a longitudinal axis 358. A second cylinder bore 346 is positioned adjacent and concentric to the bore 345. The first cylinder bore and the second cylinder bore each have an inside diameter as generally indicated by the numeral 348 and 350, respectively. A piston rod 22 is concentrically located within the first cylinder bore 345 and is allowed to translate through an aperture 356 formed in the first end wall 354 of the housing 367.

In both FIG. 1, and FIG. 2, a second housing or cylinder 78 is positioned near the housing 12 (FIG. 1) and the housing 367 (FIG. 2). The cylinder or housing 78 holds an incompressible fluid 370 and compressible fluid 371. The fluid 370 and the fluid 371 are separated by the piston 80. The response adjustment mechanism 88 is configured in fluid communication with the incompressible fluid 370 as it is transferred to and from the bore in the housing 78 to the housing 12 (FIG. 1) or the housing 367 (FIG. 2) via the channel or passageway 90. Still further, the cylinder bore 24 (FIG. 1) or the bore 345 (FIG. 2) can be configured with one or more grooves 356 formed into the housing 12 (FIG. 1) or housing 367 (FIG. 2). The groove 356 is positioned proximate to the first piston 36 and will be discussed in further detail below.

Figure 3:
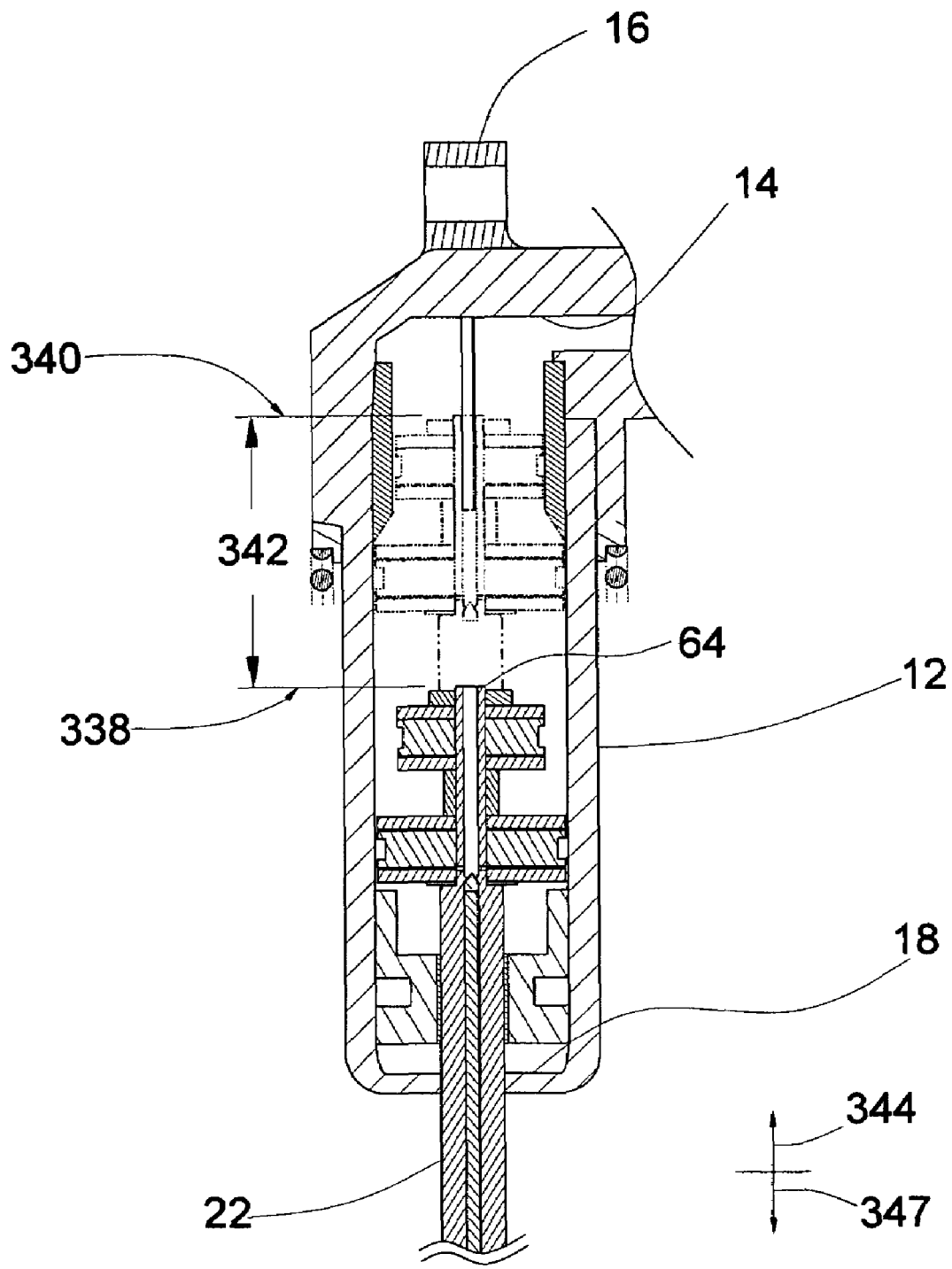
FIG. 3 is a simplified partial cross-sectional view of a piston rod in two positions defining the stroke length of the shock absorber apparatus.

Now referring to FIG. 3, a portion of the shock absorber apparatus 10 is shown having a piston rod 22 that is movable in direction generally indicated by the arrow 344 through an aperture 23 (FIG. 1) through the first wall 18 of the housing or cylinder 12. The piston rod 22 is configured to translate within the bore 24 (FIG. 1) over a range of positions at varying speeds depending on the external forces applied to the rod 22 and the pinion 16. The piston rod 22 has a second end 64 and is shown in FIG. 3 at a first position 338. For reference, when the end 64 of the rod 22 is located at the first position, the apparatus 10 is said to be in its returned state. A second reference point is shown at the point where the end 64 is located at the position designated by the numeral 340. At this point, the apparatus 10 is said to be in its bottomed state. A distance generally designated by the numeral 342 is measured as the difference between the first position 338 and the second position 340. The distance 342 may be considered the stroke length of shock absorber apparatus 10. In this specification, when the motion of the rod 22 is in the direction designated by the arrow 344, the motion is said to be compressive; when the motion of the rod 22 is in the direction designated by the arrow 347, the motion is said to be returning.

Furthermore, a low speed definition consists of rod 22 travel anywhere in the stroke, from zero until the speed and volume of the rod 22 may overcome a volume movement of liquid through the low speed portion of the response adjustment mechanism 88 and the dampening valve assembly movement that have been selected and set per leverage and the speed of travel per the shock absorber apparatus 10.

Furthermore, a medium speed definition consists of rod 22 travel anywhere in the stroke, from zero until the speed of the rod 22 travel has overcome the low speed settings and adjustments. A rod 22 travel exceeds the resistance of a given low speed volume control to another volume and resistant control. Within the given volume of the rod 22 and stroke travel per leverage and speed of travel per shock absorber apparatus 10.

Finally, a high speed definition consists of rod 22 travel anywhere in the stroke from zero until the speed has over come the low speed and mid speed adjustments for a given volume per shock and leverage and the speed ratio. A high speed rod travel movement consist of a supposed maximum speed traveled by the rod to control all speeds that can overcome the low and mid speed pathways or rod volume per low and mid speed.

Figure 4:
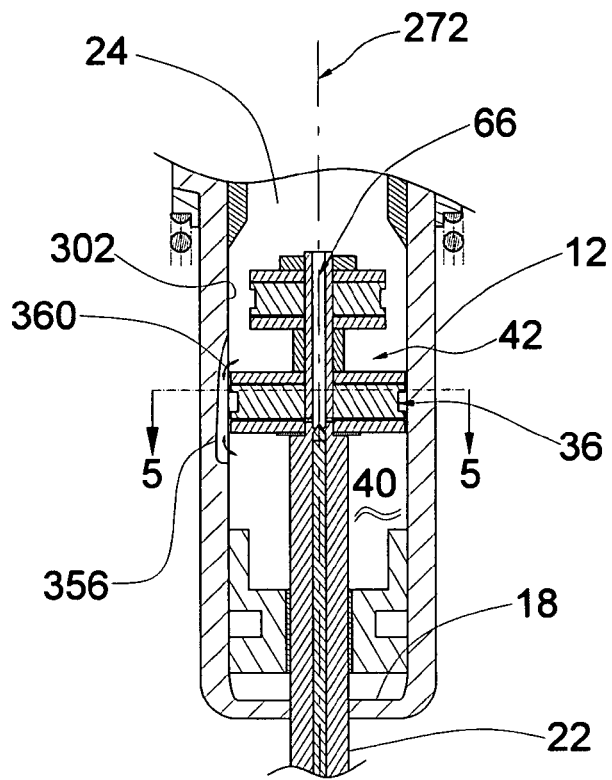
FIG. 4 is a simplified partial cross-section of a portion of the shock absorber apparatus with a groove formed in the wall of the housing or cylinder body.
Figure 5:
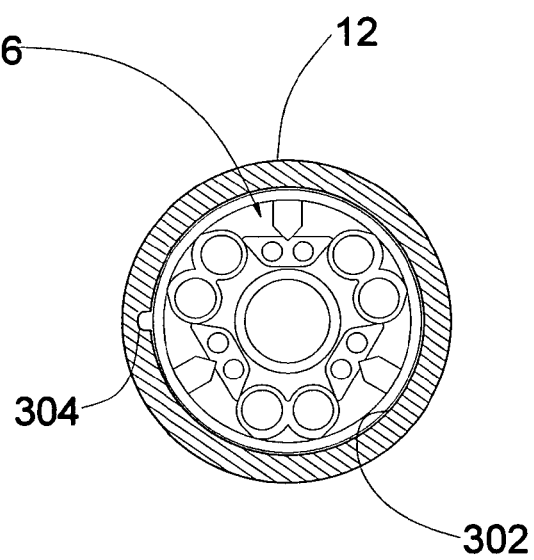
FIG. 5 is a sectional view of the housing or cylinder body and the first piston with a groove formed in the wall of the housing or cylinder body.

Referring now to FIG. 4 and FIG. 5, a cylinder or housing 12 is shown position positioned along the longitudinal axis 272. The piston rod 22 extends into the cylinder or housing 12 through an aperture 23 as shown in FIG. 1. A first piston 36 is fastened to the rod 22 and is translatable in a space formed by the housing or cylinder 12 as generally indicated is the cylindrical bore having the numeral 24. A first chamber 40 is defined by the position of piston 36. A second piston 38 (FIG. 1) is shown, and also positioned on the piston rod 22, and defines a second chamber 42 (FIG. 1). The cylinder or housing 12 defines an internal bore 24 that forms an internal surface 302. The surface 302 may include one or more grooves 356 which are formed into the cylinder or housing 12. The groove 356 forms a communication channel between chambers 40 and 42, providing a bleed or bypass flow 360 when the first piston 36 is proximate to the groove 356. The groove 356 provides an enhancement to the flow of the incompressible fluid around the first piston 36 and can be configured to affect a desirable dampening characteristic. The location of the one or more grooves 356 may provide a variable damping characteristic that may be configured by choosing the location, width, length, depth, and taper of the groove 356 relative to the location of piston 36 and the first position 338 (FIG. 3). In a preferred embodiment, the groove is positioned proximate to the piston 36 when the shock absorber apparatus is configured near its bottomed state, and has an initial depth at the first end of the groove 356 proximate to the end wall 18, and further has a depth that is taped along its length so that the depth at a second opposite end 356 is less than the depth at the first end. The groove 356 has been shown to provide a desirable dampening characteristic during lowspeed operation of the shock absorber apparatus 10.

Figure 6:
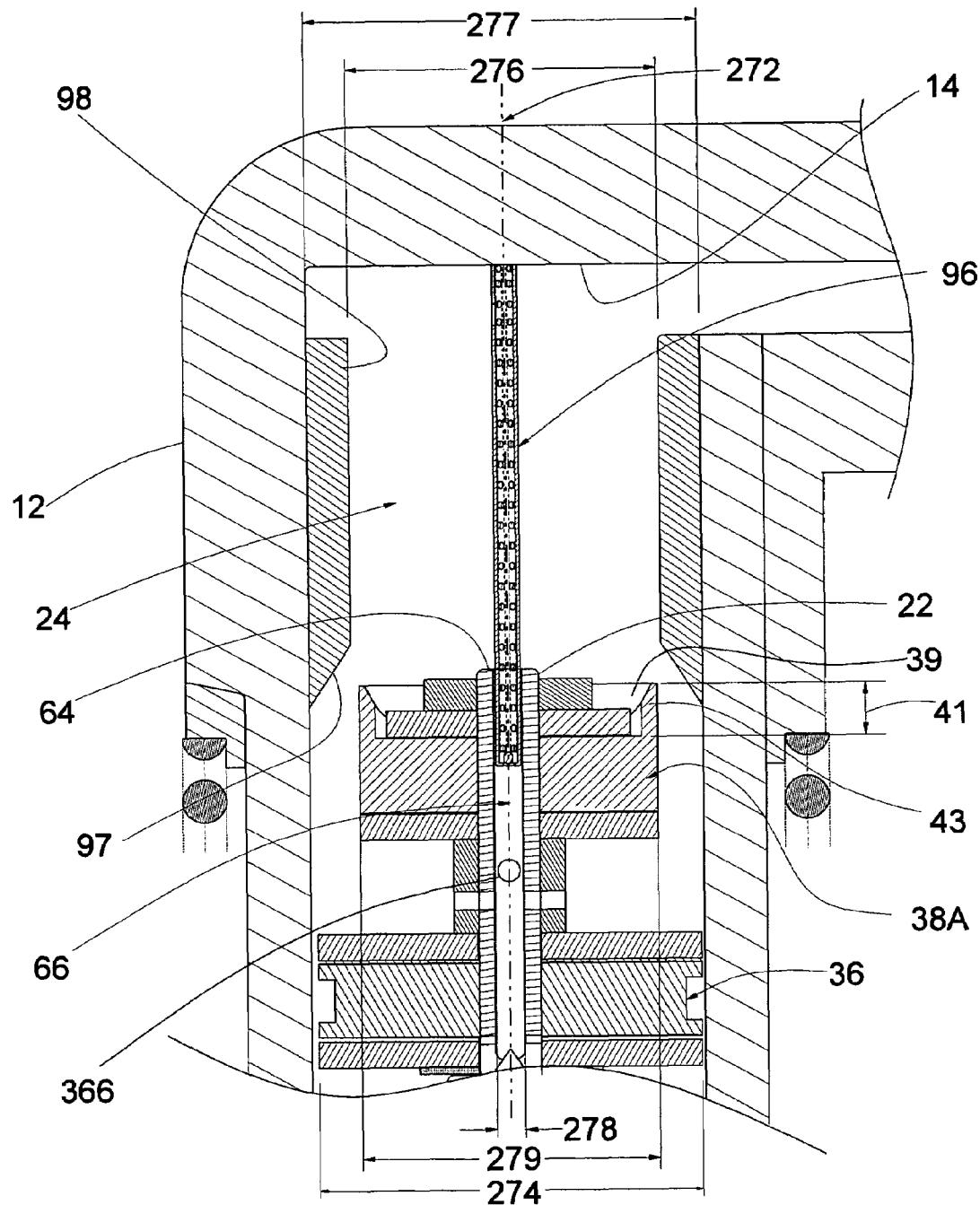
FIG. 6 is a partial cross-sectional view of a portion of the shock absorber apparatus including the second piston and needle assembly.

Now referring to FIG. 6 a simplified view of the upper portion of the shock absorber apparatus is shown. A sleeve 98 a shown position proximate to the second end wall 14 of the housing or cylinder 112. The sleeve 98 has an outside diameter 277 and an inside diameter 276 and is positioned along and concentric to the longitudinal axis 272. A first piston 36 is shown having an outside diameter as generally indicated by the numeral 274 positioned on the piston rod 22 (FIG. 1). A second piston 38 is shown having an outside diameter as is generally indicated by the numeral 279 and is positioned near the second end 64 of the piston rod 22 as shown in FIG. 1. A needle assembly 96 is shown attached to the second wall 14 of the housing or cylinder 12 and extends into the second cylindrical bore 24. A piston rod 22 includes a bore 66 which is drilled concentrically through its length.

The outer diameter 274 of the piston 36 is selected so that the piston 36 may move in a sealing fashion within the cylinder bore 24. This outside diameter 274 is approximately equal to the dimension 277 is only different by the amount of clearance required for tolerance and to provide a slideable fit. Similarly, the second piston 38A has the outside diameter 279 is configured with an outside diameter similar to the inside diameter of the sleeve 98 as indicated by a the dimension 276. The dimension 279 and the dimension 276 are approximately equal and are selected such that the second piston 38 is able to movably translate within the cylindrical bore 24.

The piston 38A is shown as a variation of piston 38 having a cup shaped surface 39 defining a crown 43 having a height dimension generally indicated by the numeral 41. The piston 38A also may have a cylindrical shape without the indentation shown on piston 38 for the sealing band. For this specification, piston 38A and piston 38 are identical in other respects.

Still referring to FIG. 6, a needle assembly 96 is positioned adjacent to the second and wall 14 of the housing or cylinder 12. The needle assembly is concentrically positioned along the longitudinal axis 272 of the bore 24. The needle assembly 96 extends from the second wall 14 toward opposite end of the cylinder bore 24 and extends beyond the edge 97 of the sleeve 98. The needle assembly 96 may be configured with straight sides, or alternatively, may have a taper to accomplish a damping characteristic. Regardless of the shape of the needle assembly 96, however, the outside diameter of the assembly 96 is selected to fit within the bore 66 of the rod 22 as the hydraulic apparatus approaches its bottomed state. The piston rod 22 further includes one or more apertures 366 formed therein and extending to the bore 66 to provide a fluid path as will be discussed below.

Figure 7:
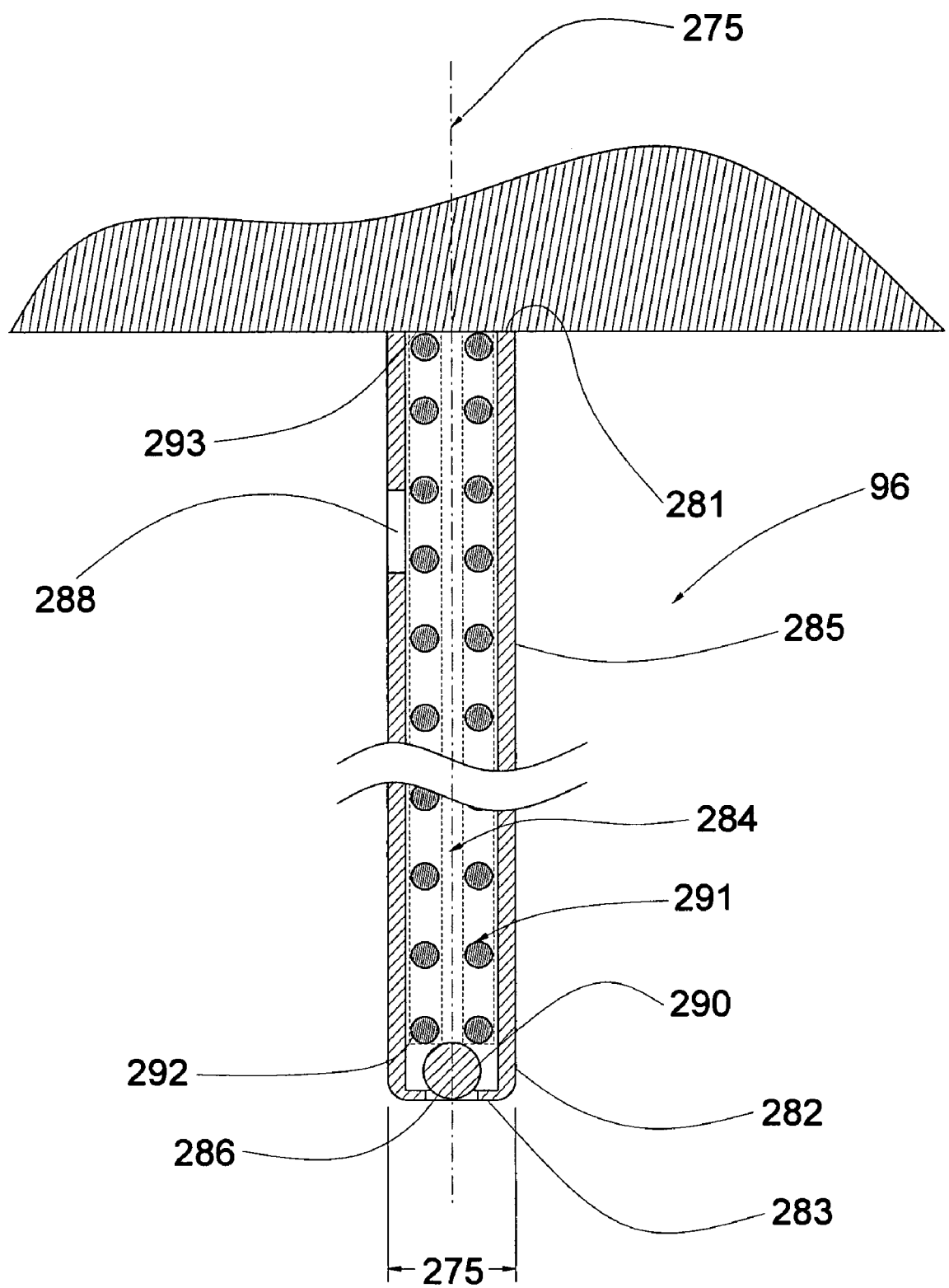
FIG. 7 is a cross-sectional view of a needle assembly in the shock absorber apparatus.

Referring now to FIG. 7, a needle assembly 96 is shown. The assembly 96 includes a needle member 285 having a bore 284 and a first end 281 an opposite second end 282. The needle member 285 may be tapered over its length to affect a dampening characteristic of the shock absorber 10. The first end 281 is attached to the wall 14 (FIG. 1) or alternatively to 353 (FIG. 2). The member 285 has an end wall 283 positioned proximate to the end 282. An aperture 286 is formed in the wall 283 forming a fluid passage between the bore 284 and the bore 24 when it is unobstructed. Another aperture 288 is formed on the surface of the member in intermediate position between and the end 281 and the end 282. A helical spring 291 is shown inserted into the member 285 and is shown extending from the end 281 to the end 282. The first end 292 of the spring 291 is positioned adjacent to a sphere 290. From the drawing, it should be apparent that the sphere 290 and the spring 291 may move within the tube 285 within the bore 284. This sphere 290 is shown positioned adjacent to the aperture 286 and serves to obstruct the aperture 286 reducing or blocking the fluid passage formed by the combination of the aperture 286 to the bore 284 to the aperture 288 when the force upon the sphere 290 imparted by the incompressible fluid is insufficient to overcome the load provided by the spring 291 in concert with the gravitational force and inertial forces exerted on the sphere. A fluid flow (not shown) may enter the aperture 286 and flow through the bore 284 an exit the aperture 288 causing an upward force on the sphere 290 which causes the spring 291 to contract allowing fluid flow freely. Alternatively if there is a pressure at the aperture 288 which initially causes fluid to flow from 288 to the aperture 286 this will cause a force on the sphere 290 to cause it to translate towards the end 282 until it contacts and it reduces or restricts the fluid flow between the aperture 288 and the aperture 286. In this respect, it should be understood, that the needle assembly 96 may act as a check valve allowing flow from the aperture 286 to the aperture 288 and restricting flow that from the aperture 288 to the aperture 286. The tube 285 has an outside diameter generally indicated by the dimensional measurement 275 and is configured to be less than the inside bore 66 diameter within the piston rod 22. Thus, the dimension 275 should be less than the dimension 278 (FIG. 6).

Figure 8A:
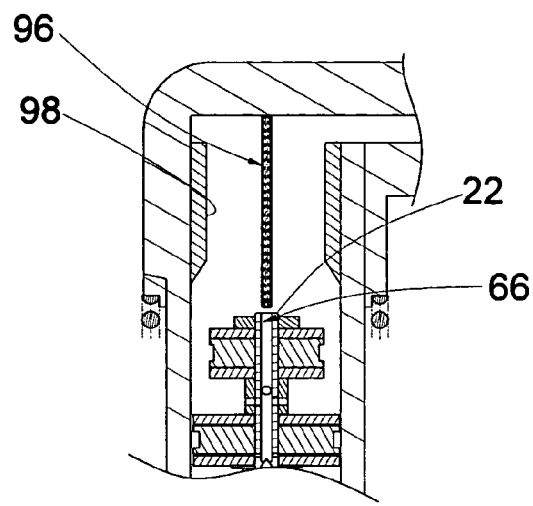
FIG. 8A is a partial cross-sectional view of a portion of the shock absorber apparatus including the second piston and needle assembly as the piston rod is distant from the needle assembly.
Figure 8B:
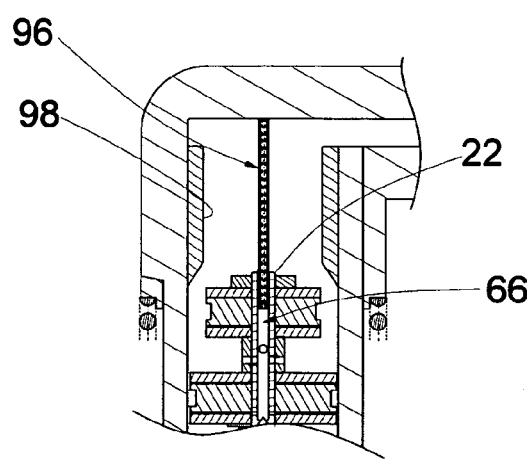
FIG. 8B is a partial cross-sectional view of a portion of the shock absorber apparatus including the second piston and needle assembly as the needle assembly enters a bore in the piston rod.
Figure 8C:
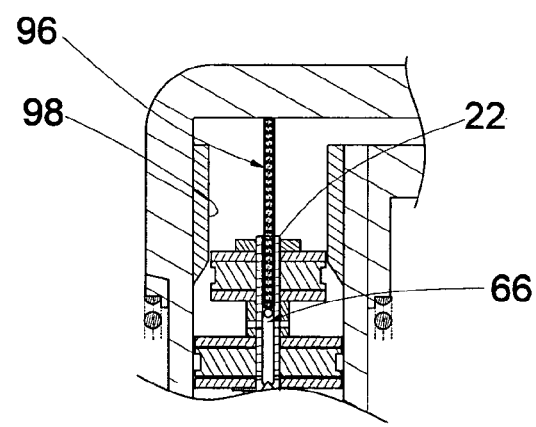
FIG. 8C is a partial cross-sectional view of a portion of the shock absorber apparatus including the second piston and needle assembly as the second piston is adjacent to a sleeve.

Now referring to FIGS. 8A, 8B, and 8C, a sequence is shown of the shock absorber assembly with an interaction between the piston rod 22 and the needle assembly 96 as well as an interaction between the second piston 38 and the sleeve 98. As shown in FIG. 8A, the piston rod 22 is shown proximate end of the needle assembly 96. However, in the position shown, needle assembly 96 has not yet entered the bore 66 of the rod 22. Now referring to FIG. 8B, the rod 22 is shown in an advance position relative to the position shown in FIG. 8A. As shown in the drawing, the assembly 96 has entered the bore 66 of the rod 22. Now referring to FIG. 8C, the needle assembly 96 is shown partially engaged in the bore 66 of the rod 22. Furthermore, the second piston 38 is shown in a position that is adjacent to the sleeve 98.

Now referring to FIG. 9, the response adjustment mechanism 88 is shown in a cross sectional view. The response adjustment mechanism 88, and in a preferred embodiment, includes three adjustable valves concentrically located and coaxially positioned, one within the other, and along a longitudinal axis 100. A first adjustment valve 103 is shown as the innermost valve, and centered along the longitudinal axis 100. A third adjustment valve 107 is shown as the outermost valve, and centered about the longitudinal axis 100. A second adjustment valve 105 is shown positioned between the first adjustment valve 103 and the third adjustment valve 107, and centered about the longitudinal axis 100.

The drawing includes several boundary lines that generally indicate the components associate with each adjustable valve in the response adjustment mechanism. It should be understood that this boundary line provides only a general representation, since some of the elements of the valves are shared amongst themselves.

A boundary line generally indicated by the numeral 102 provides a guideline boundary generally indicating the elements included to make the first adjusting valve in the response adjustment mechanism 88. The valve bounded by the guideline boundary 102 is a type of needle valve whose construction will discussed in further detail below. A boundary line generally indicated by the numeral 104 provides a guideline boundary generally indicating the elements included in the second adjusting valve in the response adjustment mechanism 88. The valve bounded by the guideline boundary 104 includes a bore 106 that is configured to receive the valve bounded by the guideline boundary 102 in coaxial relation. The valve bounded by the guideline boundary 104 is a type of valve that controls the flow as a function of the pressure on the valve, which in this specification, is referred to as a pressure controlled valve, whose construction will be discussed in further detail below. A boundary line generally indicated by the numeral 108 provides a guideline boundary generally indicating the elements included in the third adjusting valve in the response adjustment mechanism 88. The valve bounded by the guideline boundary 108 includes an element 110 that is configured to receive the valve bounded by the guideline boundary 102 in coaxial relation. The valve bounded by the guideline boundary 108 is a type of valve that controls the flow as a function of the pressure on the valve, which in this specification, is referred to as a pressure control valve, whose construction will be discussed in further detail below.

Figure 10:
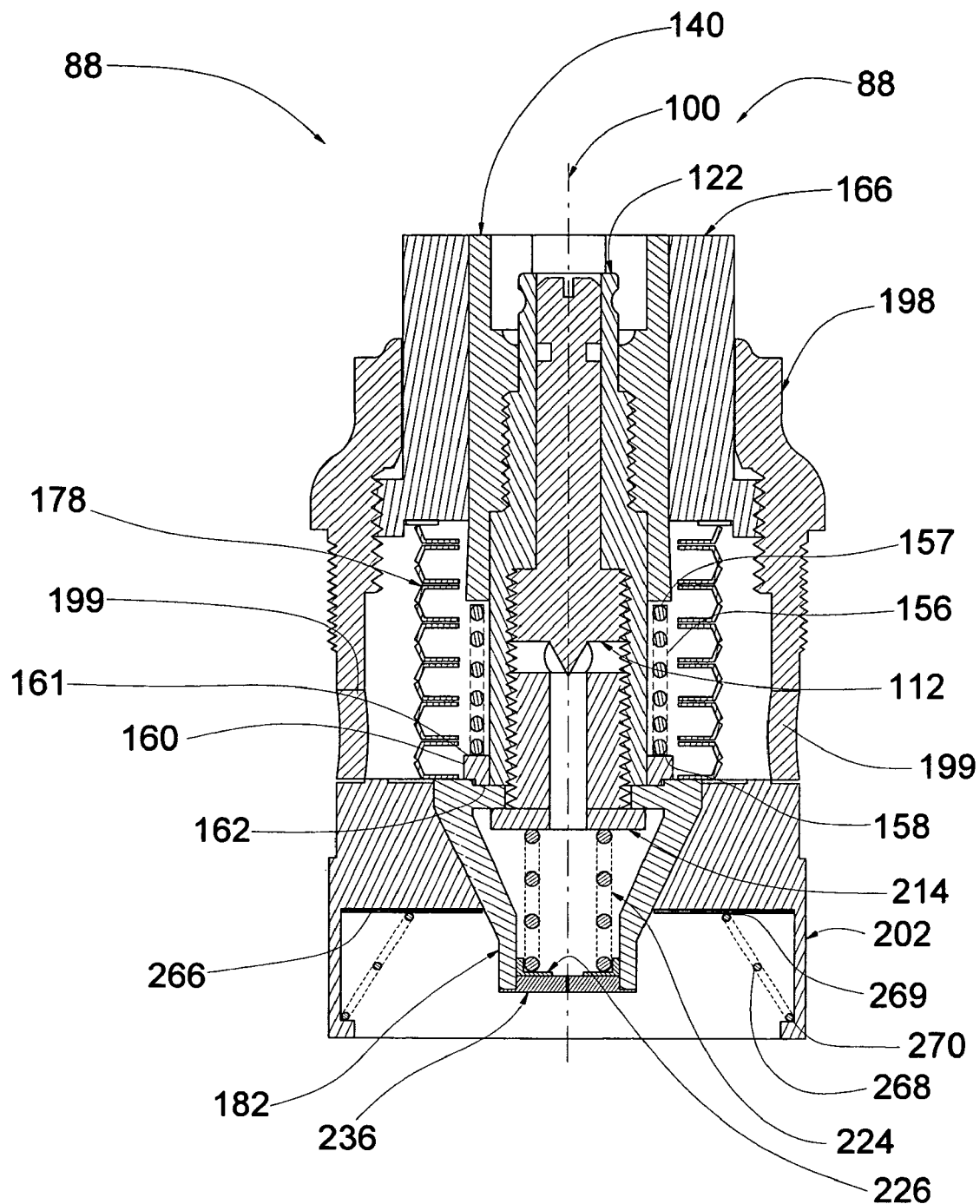
FIG. 10 is a simplified cross-sectional view of the response adjustment mechanism in the shock absorber apparatus.
Figure 11:
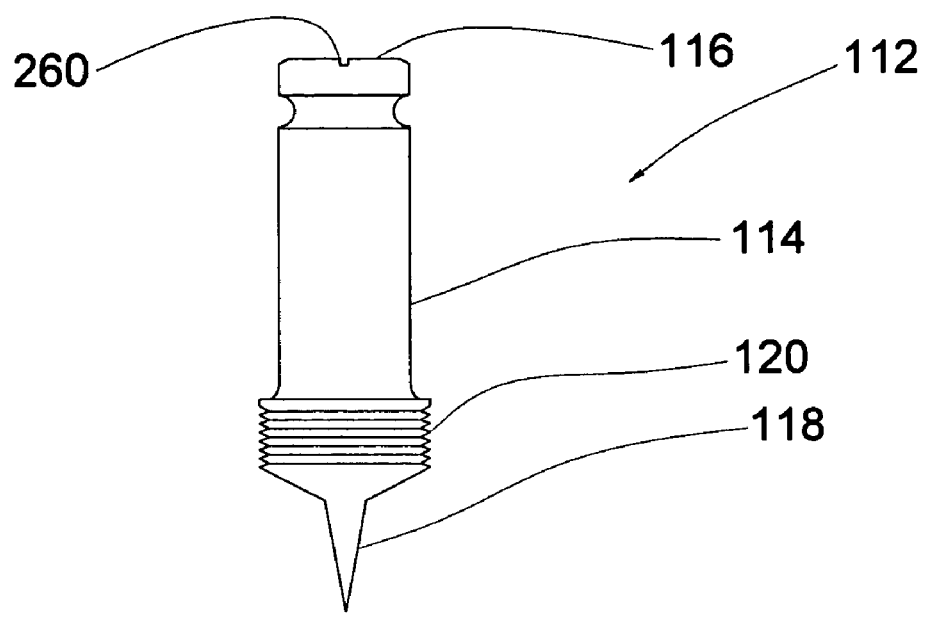
FIG. 11 is an elevation view of a stem of the needle valve in the response adjustment mechanism.

Now referring to FIGS. 1, 10 and 11, the response adjustment mechanism 88 is positioned in fluid communication between the port 92 and the port 94 of the shock absorber assembly 10. The mechanism 88 is positioned concentrically to, and along a longitudinal axis 100. A stem 112 is concentrically positioned along the longitudinal axis of 100. The stem 112 includes a first end 116 and an opposite second end 118 with thread 120 formed in the outer surface 114 proximate to the second end 120. A notch 260 is formed on the end 116 and is generally configured to allow a user to adjust the longitudinal position of the second end 120 using a screwdriver as an adjustment tool as will be discussed in greater detail below. The end 118 has conical shape or needle characteristic which is used to control the flow to and from the ports 94 and 92 during operation of the shock absorber 10.

Figure 12:
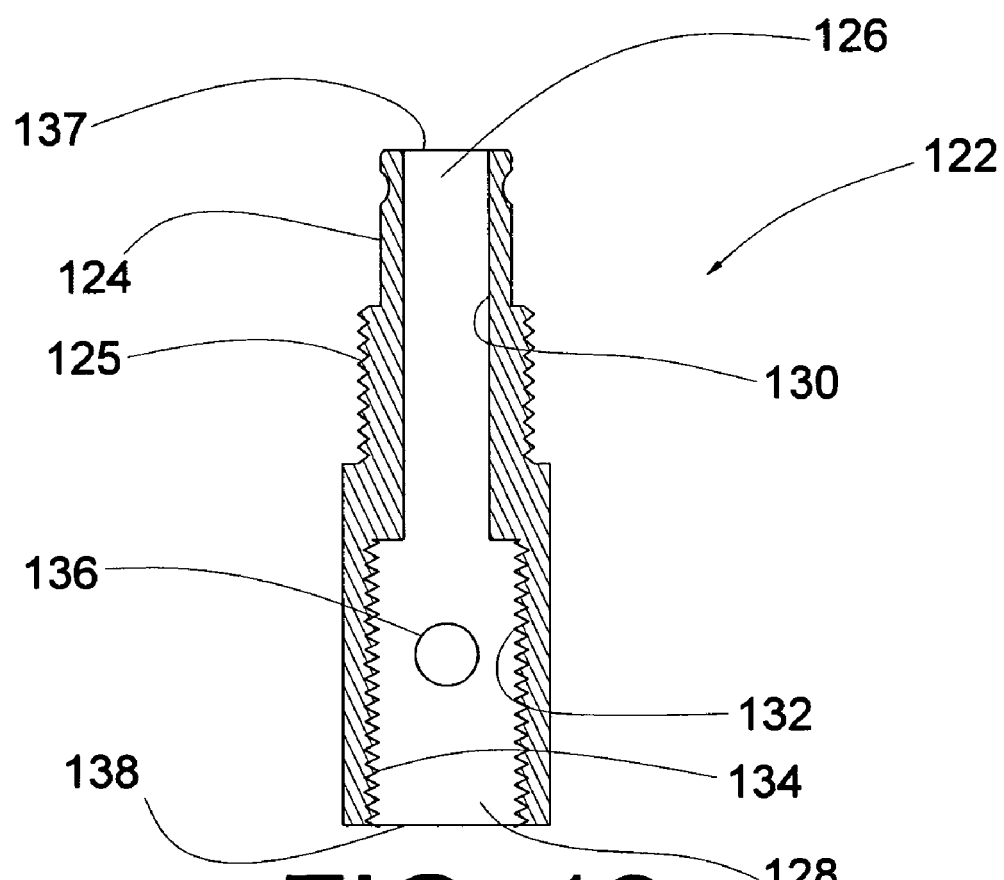
FIG. 12 is a cross-section view of a shaft that retains the stem of the needle valve in the response adjustment mechanism.

Now referring to FIGS. 10 and 12, a shaft 122 is shown having a first end 137 and an opposite second end 138. A first bore 126 is formed concentrically within the shaft 122 and extends from the end 137 to an intermediate position between the end 137 and the end 138. A second bore 128 formed concentrically within the shaft 122 extends from the end 138 to the bore 126. The bore 128 has an inner surface 132 with threads 134 form therein. The shaft 122 has an outer surface 124, wherein the outer surface has a plurality of steps. Threads 125 are formed in the outer surface 124 at an intermediate position between the end 137 and the end 138. The shaft 122 is configured to receive the stem 112 so that the end 116 of the stem 112 is inserted into the bore 128 and further extended into the bore 126. The stem 112 is brought further into the shaft 122 by engaging the threads 120 and the threads 138 together by rotating the end 116 using a screwdriver to lift the stem 112 into the shaft 122 until the end 118 is proximate to the aperture 136 formed through the shaft 122. The amount of fluid passing between the port 94 and the port 92 may be controlled by adjusting the longitudinal position of the end 118 relative to the aperture 136. As will be understood, the amount of flow that may be controlled using the valve 112 in combination with the shaft 122 is low and has been found to be most useful for controlling the response of the shock absorber when the motion of the shock absorber apparatus 10 is in a low state. One skilled in the art will readily recognize that the combination of the stem 112 and the aperture 136 in the shaft 122 forms a needle valve which is useful for controlling the flow of a fluid.

Figure 25:
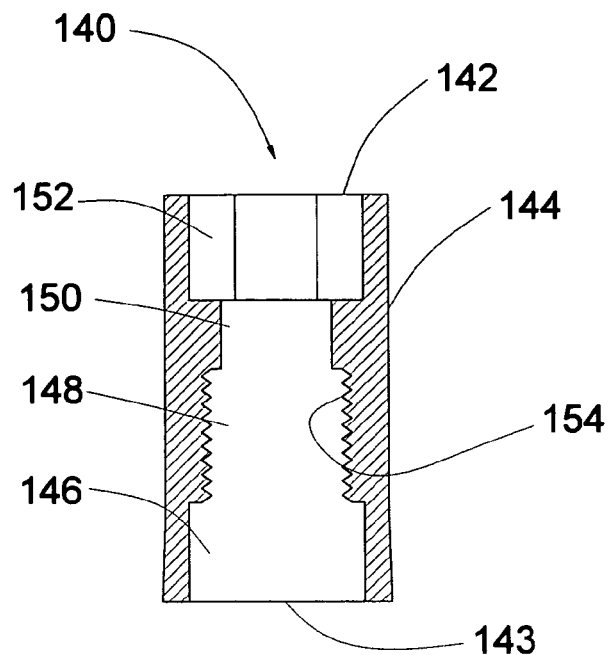
FIG. 25 is a cross-sectional view of a second shaft in the response adjustment mechanism.
Figure 26:
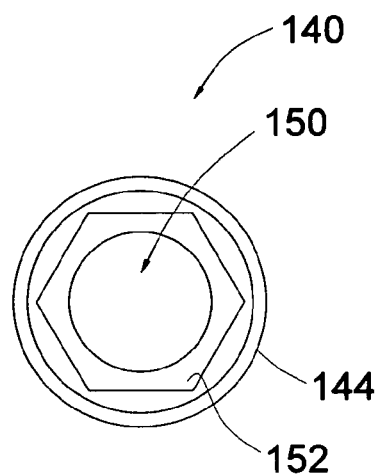
FIG. 26 is a plan view of the second shaft in the response adjustment mechanism.
Figure 27:
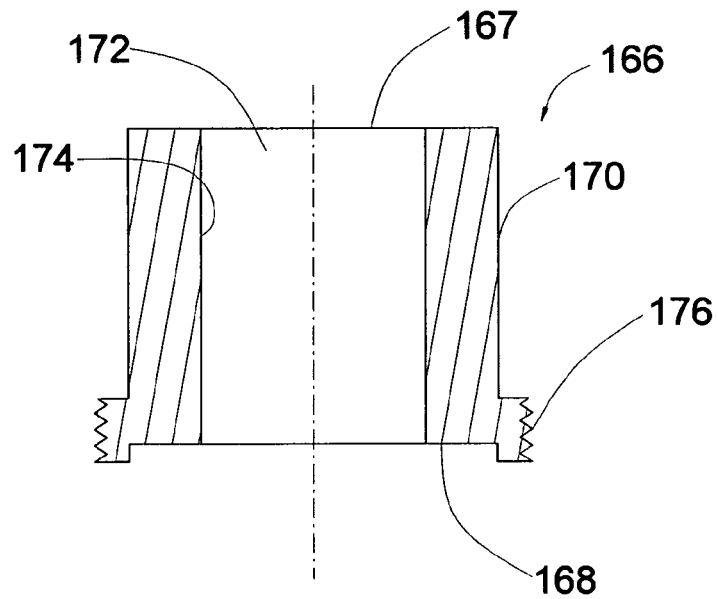
FIG. 27 is a cross-sectional view of a third shaft in the response adjustment mechanism.
Figure 28:
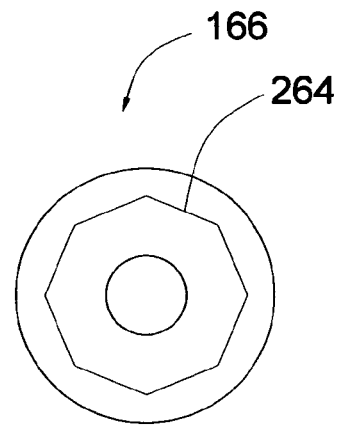
FIG. 28 is a plan view of the third shaft in the response adjustment mechanism.

As best viewed by studying FIGS. 10, 25 and 26, a second shaft 140 is shown positioned concentrically, and along the longitudinal axis 100 of the response adjustment mechanism 88. The shaft 140 has a first end 142 and an opposite second end 143. A hexagonal recess 152 proximate to the end 142 of the shaft 140 is provided for adjustment. The shaft 140 further comprises a bore 146 located proximate to the end 143. A second bore 148 extends from the first bore 146 to an intermediate location between end 142 and end 143. The bore 148 has threads 154 formed therein. A third bore 150 having a diameter less than the bore 148 a shown positioned between the hexagonal recess 152 and the second bore 148. The shaft 140 has an outer surface 144 which has a small taper so that the diameter of the surface 144 proximate to the end 143 is slightly larger than the diameter of the surface 144 proximate to the end 142.

The shaft 140 is shown concentrically and coaxially aligned with the stem 112 and the shaft 122. The shaft 140, threadingly fastens to the shaft 122 by engaging the threads 154 on the shaft 140 with the threads 125 on shaft 122. In this manner, the relative longitudinal position of the shaft 140 relative to the shaft 122 may be adjusted and set by rotating the shaft 140 relative to the shaft 122. A spring 156 has a first end 157 and an opposite second end 158. The spring 156 is shown in FIG. 10 positioned around and generally concentric to the shaft 122. The end 143 of the shaft 140 is configured to contact the end 157 of the spring 156 in force transmission relation so that the force stored in the spring 156 is exerted on to the shaft 140. In this configuration, the shaft 140 provides a preload force to the spring 156. The second end 158 of the spring 156 is borne by a first surface 161 of a first base 160. Yet further, the first base 160 is borne by a second base 182.

Figure 13:
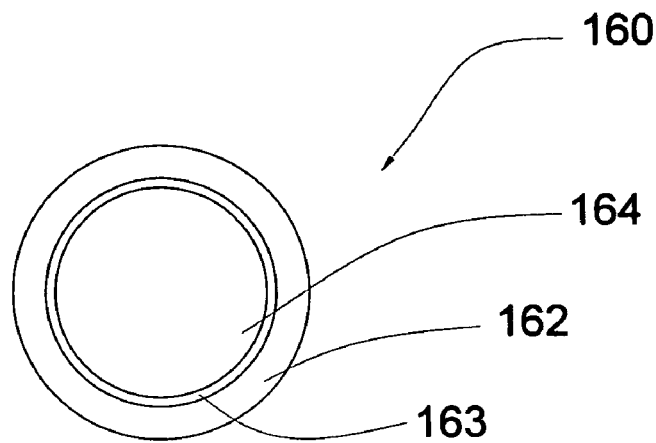
FIG. 13 is bottom view of a first base element in the response adjustment mechanism.

Now referring to FIG. 13, a bottom view of the first base 160 is shown. The base 160 has a bore 164 which is configured to provide a passage for the second end 138 of the shaft 122 to pass therein. In this position, the first base 160 is concentrically positioned around the first shaft 122 in sliding relation. Yet further, the first base 160 includes a lip 163 configured to concentrically position the first base 160 relative to the second base 182.

Figure 14:
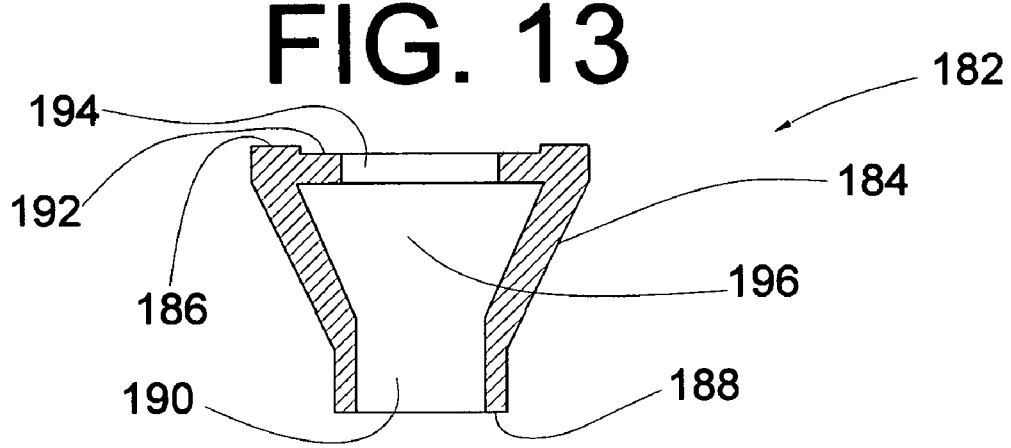
FIG. 14 is cross-sectional view of the second base element in the response adjustment mechanism.
Figure 15:
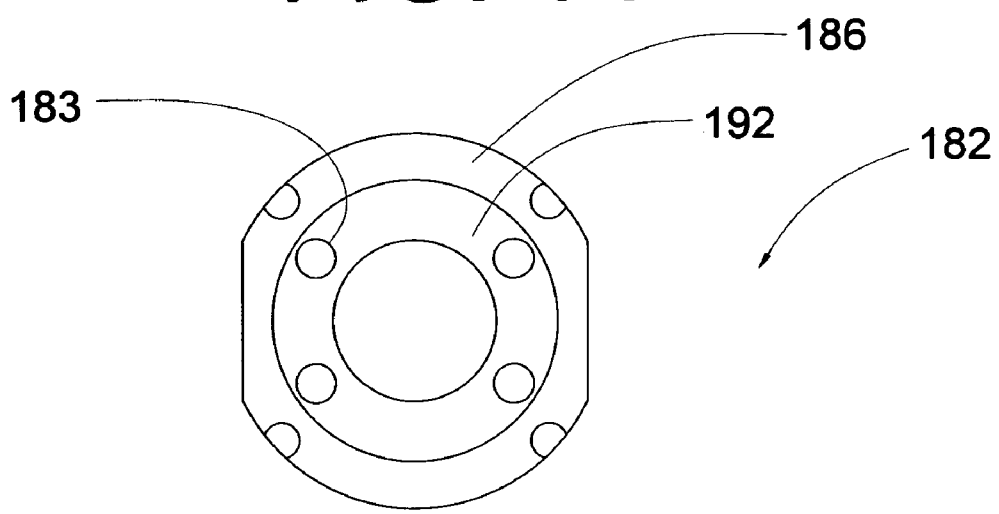
FIG. 15 is a plan view of the second base element in the response adjustment mechanism.

As best seen in FIG. 10, 14 and 15, the second base 182 includes a plurality of apertures 183 formed in the surface 192 as shown in FIG. 15. The surface 192 forms a seat configured to bear the first base 160. It should be understood from the drawing that as the base 160 is borne by the surface generally indicated by the numeral 192, the apertures 183 formed within the second base 182 are obscured by the base 160. The force stored in the spring 156 may be adjusted by rotating the second shaft 140 relative to the first shaft 122, thereby increasing the force transmitted to the first base. As fluid flows in response to an external force causing motion in the shock absorber apparatus 10, a pressure is exerted on the first base 160 resulting in an opposing force which works against the force stored in the spring 156. When the opposing force exerted on the first base 160 is sufficient to overcome the preload force stored in the spring 156, the base 160 separates from the surface 192 of the second base 182, opening an alternate path through the apertures 183 for fluids to flow having less resistance. The path for the fluid to flow in this situation, and when the shock absorber apparatus is in a compressive state, may be generally understood to occur through the second base 182 and a plurality of apertures generally indicated by the numeral 199 as shown in FIG. 10. As will be understood, the operation of the combination of the spring 156, the shaft 140, the first base 160 and the second base 182 form a pressure controlled valve which is useful for controlling the flow of fluid from port 94 to the port 92, and thereby providing a means to adjust the response of the shock absorber 10.

The second base 182 as shown in FIGS. 14 and 15 is a machined element having an outer surface 184, and having a first surface 186 and an opposite second surface 188. The outer surface 184 is bound by the first surface 184 and the second surface 188. The second base 182 also has a first concentric bore 190 that extends from a first intermediate position between the first surface 186 and the second surface 188 extending through to the second surface 188. The first surface 186 has a recessed seat 192 formed therein. The second base 182 also has a second concentric bore 194 extending from the first surface 186 to a second intermediate position located between the first intermediate position and the first surface 184. The second base 182 also has a concentric cavity 196 that extends from the first intermediate position to the second intermediate position as may be seen in FIG. 14.

Now referring to FIGS. 10, 16 and 17, a screw 214 having a bore 220 formed therein is a shown having a head 218 which is inserted into the cavity 199 of the second base 182. The screw 214 has a second end 217, and an outer surface having threads 216. The threads 216 of the screw 214 threadably and rotatably inserted into the internal threads of the first shaft 122 near the end 138 as shown in FIG. 10. The screw 214 is configured to retainingly fasten the shaft 122 and the second base 182 together. The screw 214 has channels 219 formed into the head for enhancing fluid flow in the cavity 196 of the second base 182. In addition, these channels 219 are a useful for rotating the screw 214 into the position within the response adjustment mechanism 88.

Figure 29:
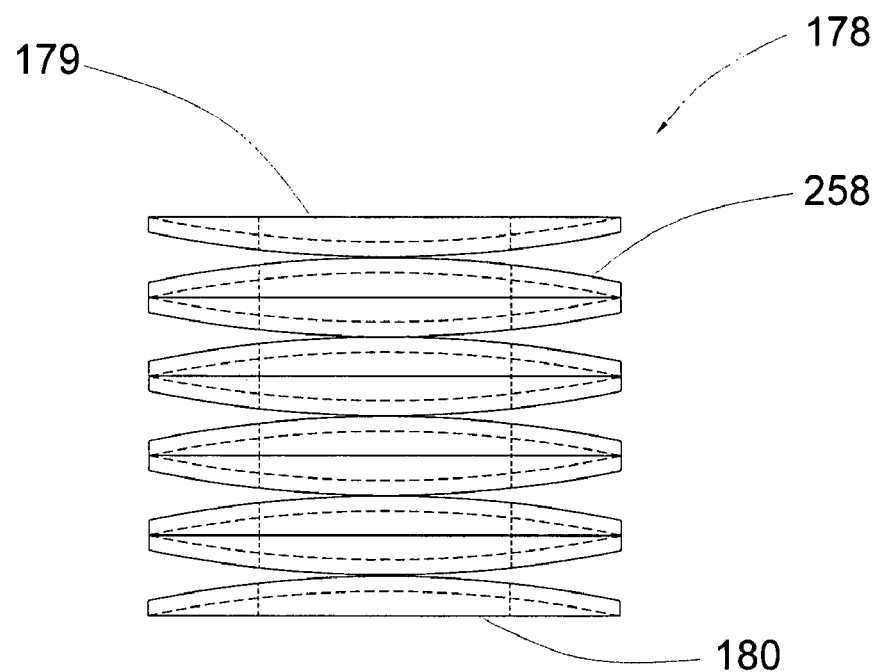
FIG. 29 is an elevation view of an example of a second spring formed from a plurality of cup springs in the response adjustment mechanism.

Now referring to FIGS. 10, 27, 28 and 29, a third shaft 166 having a first surface 167 and an opposite second surface 168. The shaft 166 is substantially concentrically aligned with the longitudinal axis 100 of the response adjustment mechanism 88. The third shaft 166 has a concentric bore 172 defining an internal surface 174. The surface 174 is configured to engage the outer surface 144 of the second shaft 140 in fastening relation. The third shaft 166 also includes an outer surface 170 forming a shoulder having threads 176 formed therein proximate to the surface 168. The surface 168 of the third shaft 166 is configured to transmit a preload force to a spring 178. Yet further, a shoulder is formed in the surface 168 which serves to act as a guide for the spring 178. The spring 178 has an aperture (not shown) which provides an opening so that the spring 178 is positioned around the shaft 140 and the spring 156. The spring 178 may be comprised of a stack of individual spring elements as shown in FIG. 29. In a preferred embodiment, the spring elements may be of the cup spring variety, with each spring having an aperture greater than the outside diameter of the shaft 140. The individual spring elements are generally indicated by the numeral 258. The spring 178 has a first end 179 and an opposite second end 180. The first end 179 of the spring 178 is positioned in force transmission relation to the surface 168 of the third shaft 166. The second end 180 of the spring 178 is positioned in force transmission relation to the second base 182 so that the spring 178 is borne by the second base 182.

As it may be understood from studying FIG. 10, the second base 182 is borne by a third base generally indicated by the numeral 202. The third shaft 166 imparts a preload force to the spring 178 by threadably engaging a housing 198 having internal threads to provide an axial preload force directed along the longitudinal axis 100. The housing 198 is retained by threadably engaging a locking cup (not shown) with the outer threads on the housing 198. A force is exerted upon the second base 182 when motion is imparted on the shock absorber apparatus 10 that develops a pressure difference between the port 94 and 92. This pressure may exert an opposing force that is opposite in direction to the preload force stored in the spring 178. When the opposing force is sufficient to overcome the preload force in spring 178, the opposing force will cause the second base 182 to separate from the third base 202. When the second base 182 separates from the third base 202, a relative large fluid flow passage is created in the gap (not shown) between the second base 182 and the third base 202 allowing fluid to pass directly from the passage 90 (FIG. 1) out the apertures 199 to the port 92 (FIG. 1) of the shock absorber apparatus 10. The amount of preload force may be preset by rotating the third shaft 166 by engaging the wrench flats generally indicated by the numeral 264 (FIG. 28) using a wrench or other suitable tool.

Referring now to FIGS. 22A, 22B, 23 and 24, several styles of the third base 202 that have been developed, and are indicated generally by the designations 202A and 202B. The third base 202 has a first surface 203 and an opposite second surface 204. Yet further, the third base 202 has a first cavity 206 having an inner surface 208 that is bounded by the first surface 203 and extends to an intermediate position between the first surface 203 and the second surface 204. The inner surface 208 is configured to support the outer surface 184 of the second base 182. The third base 202 has a second cavity 210 extending from the intermediate position to the second surface 204. The second cavity 210 defines a third surface 212 that is positioned proximate to the intermediate position. A plurality of apertures 201 are formed in the third base 203 and connected by an internal passage (not shown) to the plurality of apertures 205 formed in the third surface 212. These internal passages are useful for providing return fluid flow between port 92 (FIG. 1) and the passage 90 (FIG. 1). The apertures 199 shown in FIG. 22B are similar to the apertures 199 shown in FIG. 10 and are formed in the third base 202B rather than in the housing 198.

Now referring to FIGS. 10 and 24, a washer or plate 266 is positioned adjacent to the surface 212 of the third base 202. A spring 268 having a first end 269 and an opposite second end 270 is positioned with the first end 269 of the spring 268 positioned proximate the washer or plate 266. The end 270 of the spring 268 is borne by a notch formed in the third base 202 in retaining relation. In this configuration, the washer or plate 266 obscures the apertures 205 formed in the surface 212 of the third base 202. The pressure in the fluid from port 92 to the port 94 may exert a force on the washer or plate 266 in an opposite direction to a force stored in the spring 268. When the force generated by the pressure in the fluid is sufficient, the spring 268 will allow the plate or washer 266 to separate from the surface 212 of the third base 202 permitting fluid to flow from the port 92 to the port 94. In an alternate situation, when the pressure is greater at port 94 relative to port 92, the force exerted on the plate or washer 266 is in the opposite direction and further forces the plate or washer 266 against the surface 212 of the third base 202 effectively blocking the apertures 205. In this configuration, the combination of the washer or plate 266, the spring 268, and the shoulder of the third base 202 forms a check valve restricting the flow through the path formed from the aperture 201 to the aperture 205 in the third base 202 when the pressure is greater at the port 94 relative to the port 92 in the shock absorber apparatus 10.

Now referring to FIGS. 10, 18, 19, 20 and 21, a spring 224 is positioned concentrically along the longitudinal axis 100 of the response adjustment mechanism 88. The spring 224 is helical spring having a first end that is bounded by the screw 214. An opposite end of the spring 224 is borne by a disc 226. The disc 226 has a first surface 227 and an opposite second surface 228. A bore 230 is formed between the first surface 227 to an intermediate surface positioned between the first surface 227 and second surface 228 generally indicated by the numeral 234. A bore or aperture 232 is formed into the surface 234 and extends through the surface 228. The surface 234 of the disc 226 is configured to seat and contain an end of the spring 224 in force transmission relation. The outer surface 235 of the disc 226 is configured to slidingly translate within the bore 190 (FIG. 14) of the second base 182.

A plate 236 is borne by the second base 182 in fitting relation. The plate 236 has a first surface 237 and an opposite second surface 238, and a concentric shoulder 240 proximate to the second surface 238. The plate 236 also has an outer concentric surface 242 extending from the concentric shoulder 240 to the first surface 237. A concentric bore 244 extends from the surface 237 through the surface 238. The plate 236 further has a plurality of apertures 250 and 252, each having a longitudinal axis, 246 and 248 respectively, extending from the second surface 238 to an intermediate position between the first surface 237 and the second surface 238. The plate 236 also has a plurality of bores 254 and 256 centered along the longitudinal axis of each aperture, 246 and 248 respectively, extending from the first surface 237 to the intermediate position.

The combination of the plate 236, the disc 226, and the spring 224 within the second base 182 form a baffle assembly which is useful for controlling the flow of fluid to and from port 94 and port 92. The baffle assembly serves to provide an additional damping function useful for modifying the response of the shock absorber apparatus.

Now referring to FIGS. 10 and 30, the response adjustment mechanism 88 is provided with three separate user adjustments which are useful for modifying the response of the shock absorber apparatus 10. A first adjuster shown in FIG. 30 has a screw head generally indicated by the numeral 260. The screw head 260 is useful for controlling the position of the stem 112 relative to the aperture 136 formed in the shaft 122 thereby providing an adjustment which substantially controls the response of the shock absorber 104 during low speed motion. A hexagonal recess generally indicated by the numeral 262 permits the user to change the preload of the spring 156 by changing the longitudinal position of the shaft 140 relative to the first base 160. This adjustment controls the amount of force required to dislodge the base 160 from the second base 182 and is effective in substantially controlling the response of the shock absorber apparatus 10 during periods of medium motion. The hexagonal wrench flat 264 formed into the shaft 266 is useful for adjusting the preload of the spring 178 which controls the amount of pressure required to cause the second base 182 to separate from the third base 202. By turning flat 264, the shaft 166 is rotated relative to the second base 182 thereby modifying the preload force on the spring 178. The adjustment realized by the flat 264 allows the user to set the amount of force required that must be overcome, by the fluid pressure in the shock absorber apparatus 10 to dislodge the second base 182 from the third base 202. Typically, a high level of force is required to dislodge the second base 182 from the third base 202 relative to the other adjustments. In this way, the adjustment 264 is useful for controlling high speed motion in the shock absorber apparatus 10.

Now referring to FIGS. 31, 34, 35A, 36, 37 and 39A, a damping valve assembly 52E and associated components will now be described. A piston generally indicated by the numeral 312 is shown mounted concentrically to the rod 22. A passage 313 formed in the piston 312 allows fluid to pass from one side of the piston 313 to the other side of the piston 313 as governed by the action of the damping valve assembly 52E. A step washer 308 has an aperture 335 which forms an inside edge 336. The rod 22 is inserted into the aperture 335 of the step washer 308 in stacking relation so that the step washer 308 is adjacent to the piston 312. Yet further, the step washer 308 has an outside diameter dimension generally indicated by the numeral 333 and has a thickness dimension generally indicated by the numeral 310. A pressure plate 314 has an aperture 339 and a diameter dimension generally indicated by the numeral 337. The aperture 339 of the pressure plate 314 forms an inside edge 320 which has a thickness dimension generally indicated by the numeral 322. The diameter dimension 337 of the pressure plate 314 is selected to be greater than the outside diameter dimension 333 of the step washer 308. Yet further, the thickness dimension 322 of the inside edge 320 of the pressure plate 314 is selected so it is less than the thickness dimension 310 of the step washer 308. In this manner, the rod 22 and the step washer 308 are inserted into the aperture 339 of the pressure plate 314 in sliding relation so that both the step washer 308 and the pressure plate 314 are adjacent to the piston 312 when a preload force is applied to the pressure plate to hold it against the piston 312. A plate spring 309 having an aperture 326 is positioned in stacking relation around the piston rod and adjacent to the step washer 308. A plurality of other plate springs 444 may be positioned in stacking relation one to another around the piston rod and adjacent to the plate spring 309. A retaining means (not shown) is configured to fixedly hold the other plate springs 444, plate spring 309, and the step washer 308 in stacking relation to the piston 312. The retaining means may include but is not limited to a sleeve, nut, shoulder of a shaft or other forms of mechanically securing elements to a rod 22 in stacking relation.

Figure 31:
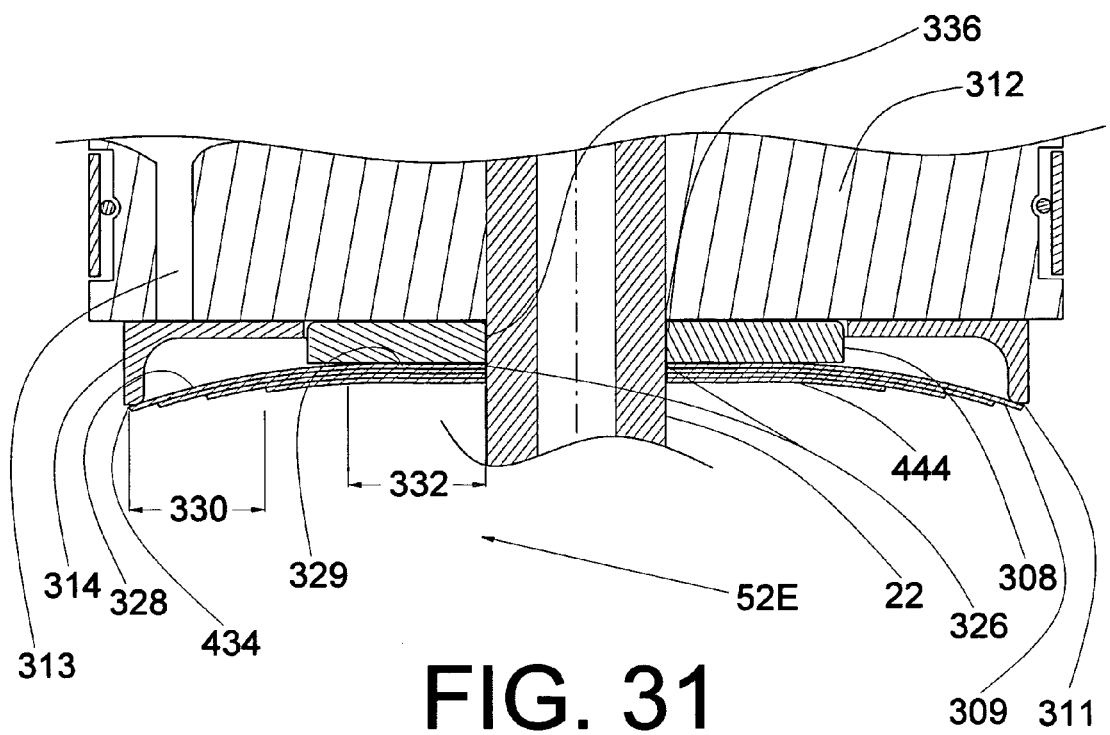
FIG. 31 is a simplified cross-sectional view of a first type of progressive fluid control valve.
Figure 38A:
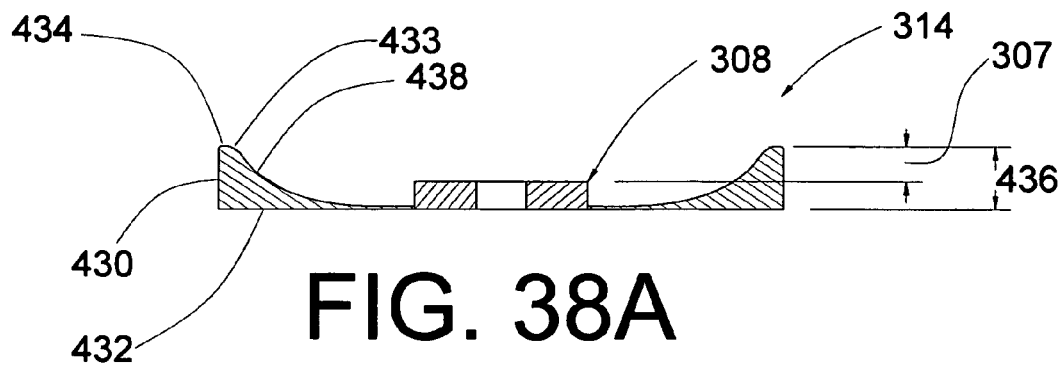
FIG. 38A is a cross-sectional view of a pressure plate with a first type of base contour as it is positioned around the step washer.
Figure 38B:
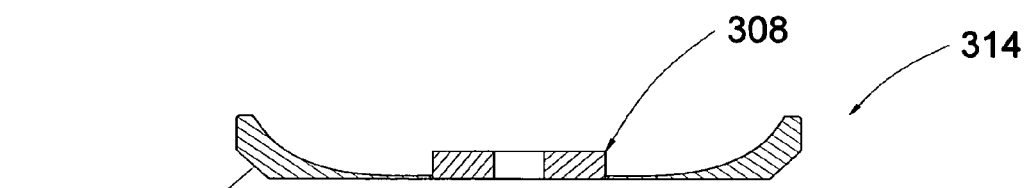
FIG. 38B is a cross-sectional view of a pressure plate with a second type of base contour as it is positioned around the step washer.
Figure 38C:
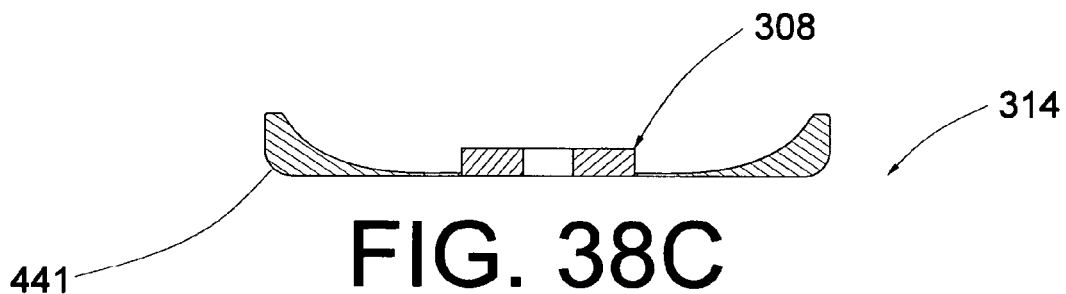
FIG. 38C is a cross-sectional view of a pressure plate with a third type of base contour as it is positioned around the step washer.
Figure 38D:
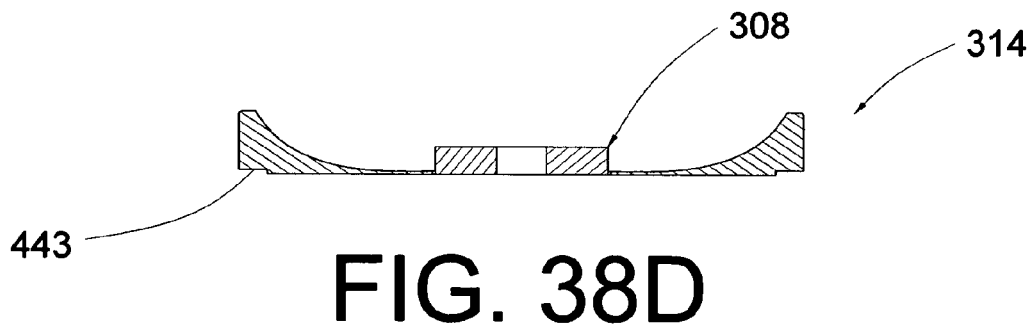
FIG. 38D is a cross-sectional view of a pressure plate with a fourth type of base contour as it is positioned around the step washer.

The pressure plate 314 has a ridge or ledge 434 and that has a thickness dimension generally indicated by the numeral 436. The pressure plate 314 is further selected so the thickness dimension 436 is greater than the thickness dimension 310 of the step washer 308. The difference between the thickness dimension 436 and the thickness dimension 310 defines an initial deflection distance of the plate spring 309 as the plate spring 309 is held in tension by the pressure plate 314. This initial deflection distance is graphically represented in FIG. 38A and is as generally designated by the numeral 307. This initial deflection distance of the plate spring 309 generates a preload force which acts on the pressure plate 314 causing it to rest adjacent to the piston 312 as shown in FIG. 31. The amount of preload force may be selected by adjusting the difference in thickness dimension, as well as by varying the effective spring rate of the combined spring 309 and other springs 444.

Now referring to FIG. 31, the plate spring 309 may be considered to have two distinct regions which are generally designated by the numerals 328 and 329. The region 329 is defined as originates from the edge of the aperture 326 of the plate spring 309 and extending outwardly relative to the aperture 326 for a distance generally indicated by the dimension 332. The dimension 332 may be considered to be about ⅙ of the outside diameter plate spring 309. The region 328 is generally in bounded by the dimension generally indicated by the numeral 330. The dimension 328 is equal to about ⅙ of the outside diameter of the plate spring 309. As may be understood by a study of FIG. 31, a portion of the region 328 of the plate spring 309 is borne by the pressure plate 314 and a portion of the region 329 of the plate spring 309 is borne by the step washer 308.

Now referring to FIGS. 32, 34, 35A, 36, 37 and 39A, another damping valve assembly 52F and associated components will now be described. The passage 313 formed in the piston 312 allows fluid to pass from one side of the piston 313 to the other side of the piston 313 as governed by the action of the damping valve assembly 52F. One or more shims 334 having an aperture are positioned in stacking relation around the rod 22 and adjacent to the piston 312. The rod 22 is inserted into the aperture 335 of the step washer 308 in stacking relation so that the step washer 308 is adjacent to the one or more shims 334. The rod 22 and the step washer 308 are inserted into the aperture 339 of the pressure plate 314 in sliding relation so that both the step washer 308 and the pressure plate 314 are adjacent to the one or more shims 334 when a preload force is applied to the pressure plate to hold it against the one or more shims 334. The plate spring 309 having an aperture 326 is positioned in stacking relation around the piston rod 22 and adjacent to the step washer 308. A plurality of other plate springs 444 may be positioned in stacking relation one to another around the piston rod and adjacent to the plate spring 309. The retaining means (not shown) is configured to fixedly hold the other plate springs 444, plate spring 309, step washer 308, and the one or more shims 334 in stacking relation to the piston 312.

Figure 32:
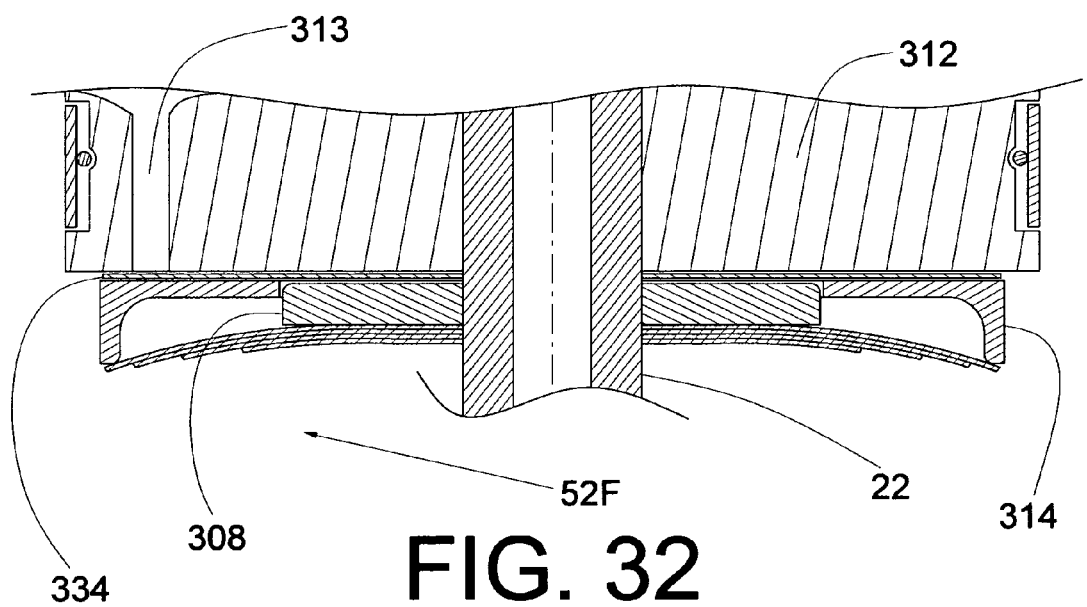
FIG. 32 is a simplified cross-sectional view of a second type of progressive fluid control valve.
Figure 33A:
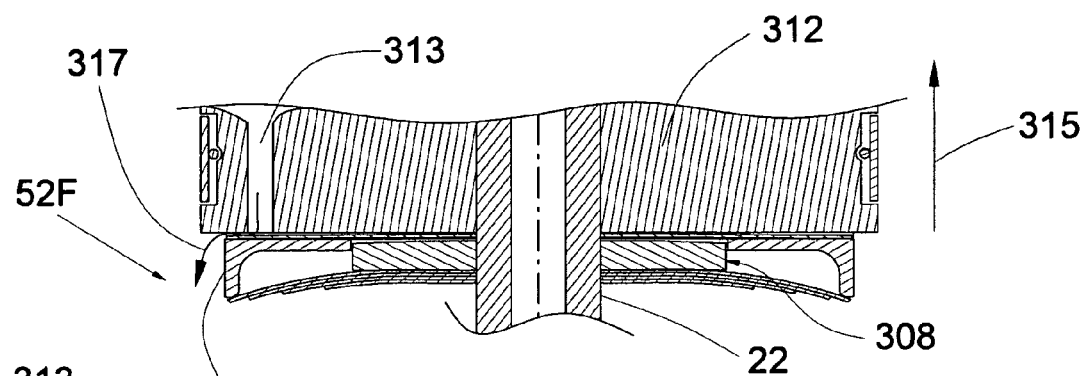
FIG. 33A is a simplified cross-sectional view of the second type of progressive fluid control valve as the piston rod translates at a low compressive speed in the shock absorber apparatus.

The damping valve assembly 52F as shown in FIG. 32 will respond to control the flow of fluid traveling through the passage 313 as will be illustrated in FIG. 33A, FIG. 33B, FIG. 33C, and FIG. 33D. In FIG. 33A, the damping valve assembly 52F is represented as a low volume of fluid (not shown) flows through the passage 313 in the direction indicated by the arrow 317 as the piston 312 translates in the direction generally indicated by the arrow pointed to the numeral 315 at a low speed. Here, the force generated by the pressure of the fluid flowing through the passage 313 and acting on the shims 334 is sufficient to slightly deflect the shims 334 a small amount, permitting a limited amount of fluid to flow through the passage 313. However, the deflection of the shims 334 is small so the outer edge of the shims 334 do not substantially act on the pressure plate 314, so that the preload force acting on the pressure plate 314 holds the pressure plate 314 in a rest position.

Figure 33B:
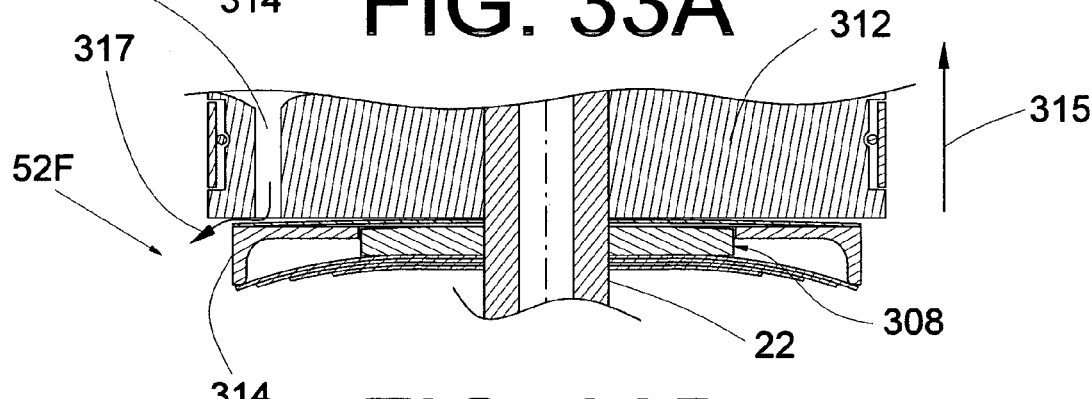
FIG. 33B is a simplified cross-sectional view of the second type of progressive fluid control system as the piston rod translates at a medium compressive speed in the shock absorber apparatus.

In FIG. 33B, the damping valve assembly 52F is represented as a medium volume of fluid (not shown) flows through the passage 313 in the direction indicated by the arrow 317 as the piston 312 translates in the direction generally indicated by the arrow pointed to the numeral 315 at a medium speed. Here, the force generated by the pressure of the fluid flowing through the passage 313 and acting on the shims 334 is sufficient to deflect the shims 334 a moderate amount, permitting a limited amount of fluid to flow through the passage 313. Further, the deflection of the shims 334 is sufficient so the outer edge of the shims 334 act on the pressure plate 314 so as to work against the preload force acting on the pressure plate 314 causing the pressure plate 334 to slidingly translate along the step washer 308 from the rest position in a direction away from the piston 312.

Figure 33C:
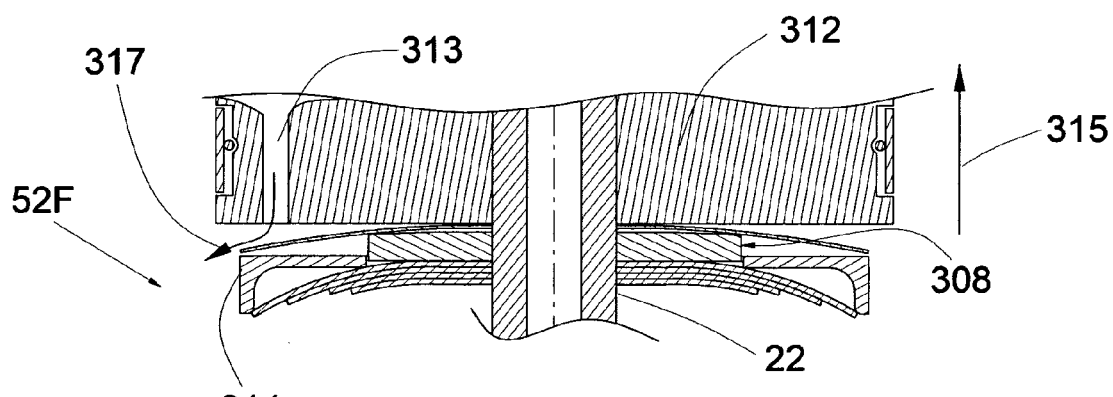
FIG. 33C is a simplified cross-sectional view of the second type of progressive fluid control system as the piston rod translates at a high compressive speed in the shock absorber apparatus.

In FIG. 33C, the damping valve assembly 52F is represented as a high volume of fluid (not shown) flows through the passage 313 in the direction indicated by the arrow 317 as the piston 312 translates in the direction generally indicated by the arrow pointed to the numeral 315 at a high speed. Here, the force generated by the pressure of the fluid flowing through the passage 313 and acting on the shims 334 is sufficient to deflect the shims 334 a substantial amount, permitting a large amount of fluid to flow through the passage 313. Further, the deflection of the shims 334 is sufficient so the outer edge of the shims 334 act on the pressure plate 314 so as to overcome the preload force acting on the pressure plate 314 which causes the pressure plate 334 to slidingly translate a significant distance along the step washer 308 from the rest position and away from the piston 312.

As should be apparent to one skilled in the art, and from studying FIGS. 32, 33A, 33B, and 33C, the arrangement of the damping valve assembly 52F as shown in FIG. 32 has been shown to provide an exemplary response which is desirable in controlling the response in a shock absorber apparatus 10. For example, the shims 334, pressure plate 314, step washer, and combination of plate springs 309 and 444 may be selected to provide a soft response characteristic during low speed operation, a firm response characteristic during medium speed operation and a soft response characteristic during high speed operation of the shock absorber apparatus 10. Such a response characteristic of the damping valve assembly 52F is desirable in some situations where it is desirable to provide a range of adjustability that can be attained using the response adjustment mechanism 88 in concert with the damping valve assembly describe herein.

Figure 34:
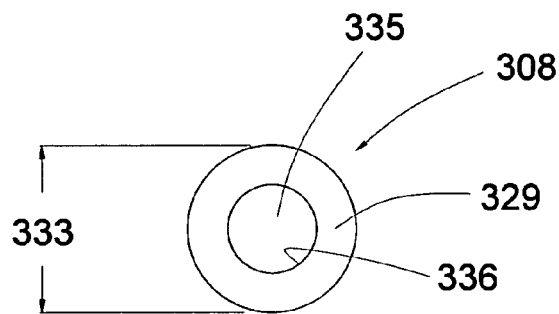
FIG. 34 is a plan view of a step washer in the shock absorber apparatus.
Figure 35A:
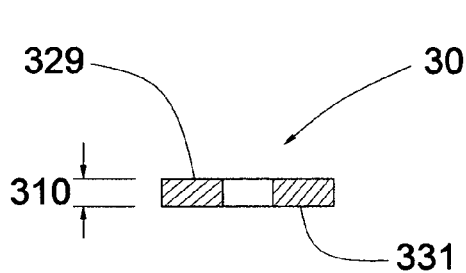
FIG. 35A is an elevation view of a first type of step washer in the shock absorber apparatus.
Figure 35B:
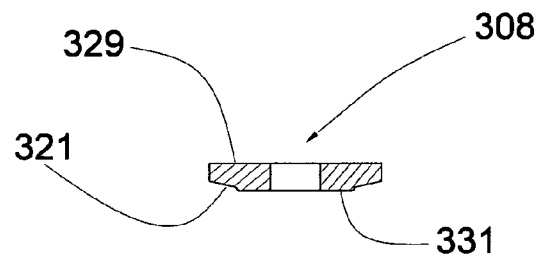
FIG. 35B is an elevation view of a second type of step washer in the shock absorber apparatus.
Figure 35C:
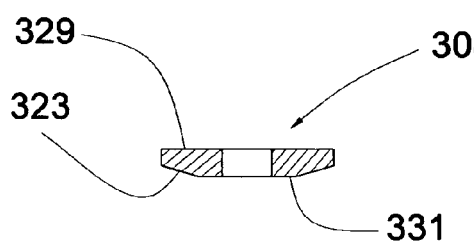
FIG. 35C is an elevation view of a third type of step washer in the shock absorber apparatus.
Figure 35D:
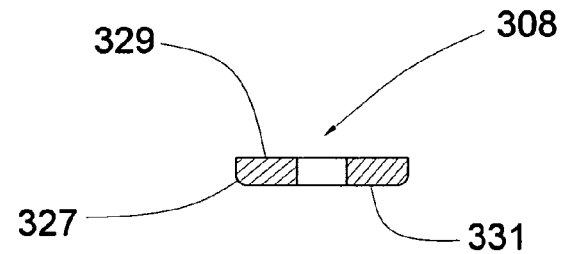
FIG. 35D is an elevation view of a fourth type of step washer in the shock absorber apparatus.
Figure 36:
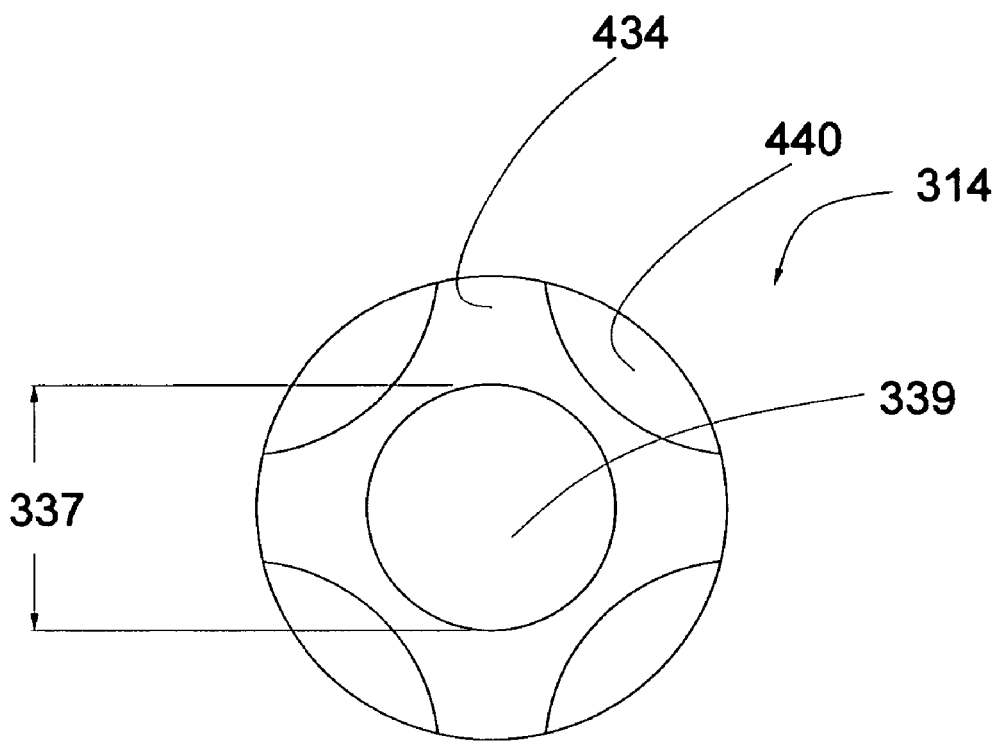
FIG. 36 is a plan view of the first type of the pressure plate in the shock absorber apparatus.
Figure 37:
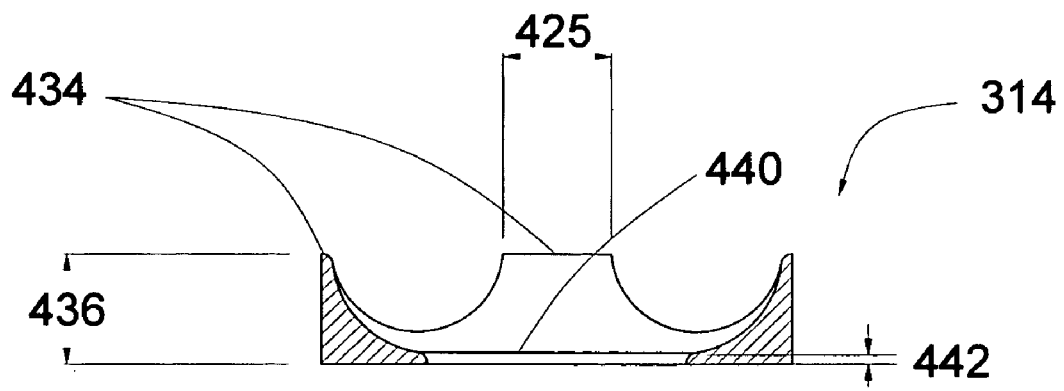
FIG. 37 is a cross-sectional view of the first type of the pressure plate in the shock absorber apparatus.

Now referring to FIG. 34, a plan view of the step washer 308 is shown having the aperture 335 which is configured to slide over the outside diameter of the rod 22. The surface 329 of the step washer 308 is a show in FIG. 35A. The shape of the step washer 308 may be modified to achieve varying desirable results depending on the type of pressure plate 314 and the type of shock absorber apparatus 10. The step washer 308 is shown having a thickness generally indicated by the numeral 310 and has a characteristic flat surface 329 and an opposite flat surface 331. Now referring to FIG. 35B, the step washer 308 has a flat surface 329 and a stepped corner surface 321 joined by a flat surface 331. In the preferred embodiment, the surface 331 is positioned proximate to the piston 312 in FIGS. 31, 32, 33A, 33B, and 33C. Now referring to FIG. 35C, another variety of the step washer 308 having a flat surface 329 is shown with an angle surface 323 joining the flat surface 331 which is parallel to the surface 329. The surface 331 is positioned proximate to the piston 312 in the system is shown in FIGS. 31, 32, 33A, 33B, and 33C. Now referring to FIG. 35D, the step washer 308 is shown having a radius corner proximate to the flat surface 331. In FIGS. 31, 32, 33A, 33B, and 33C, the flat surface 331 would be positioned proximate to the piston 312.

Now referring to FIGS. of 36 and 37, the pressure plate 314 of a first variety is shown in further detail. As previously stated, the pressure plate 314 has an inside diameter 337 configured to be less than the outside diameter 333 of the step washer 380. The pressure plate 314 further includes ridges or ledges generally indicated by the numeral 434. Further the pressure plate 314 also includes valleys generally indicated by the numeral 440. The pressure plate 314 has the ridge or ledge 434 which are characterized by depth dimension 436. Further, the valley 440 of the pressure plate 314 is characterized by a depth dimension 442. From inspection, it is evidence that the dimension 436 is greater than the dimension 442. Furthermore, the ridge or ledge 434 has a width dimension generally indicated by the numeral 425.

Now referring to FIG. it 38A, 38B, 38C, 38D, a cross section of the step washer 308 surrounded by the pressure plate 314 is shown. Each pressure plate 314 is shown with a different corner effect as will be discussed below. The pressure plate 314 has a flat surface generally indicated by the numeral 432 and the ridge or ledge of 434 and a second surface substantially opposite of the first surface generally indicated by the numeral 438. The surface 438 extends in an upward or outward direction from the inner edge 320 (FIG. 39A) forming a radius 433 an reaching an apex at the ridge or ledge 434. The pressure plate 314 also has an outside surface 430 which forms a corner transition. Now referring to FIG. 38B, an additional surface 439 having a flat characteristic is shown. Now referring to FIG. 38C, the pressure plate 314 has a radius corner 441. Now referring to the 38D, the pressure plate 314 has a step surface generally indicated by the numeral 443. It should be understood that the examples shown in FIGS. 38A-D are representative of some of the corner characteristics that may be applied to the pressure plate 314 but there are other that may be considered to fall within the scope of this specification.

Figure 39A:
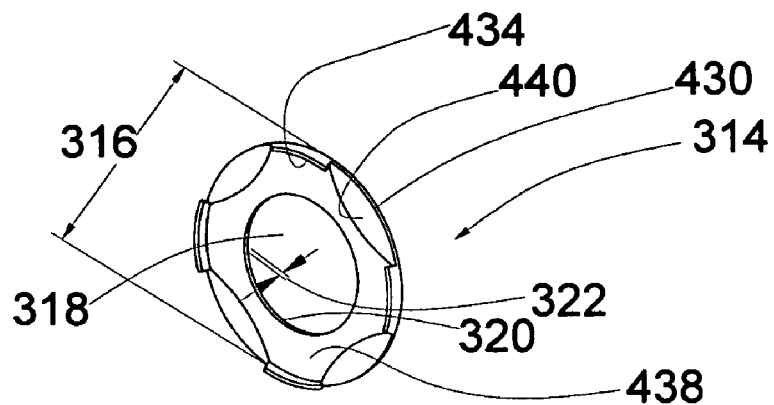
FIG. 39A is a side perspective view of a second type of pressure plate in the shock absorber apparatus.
Figure 39B:
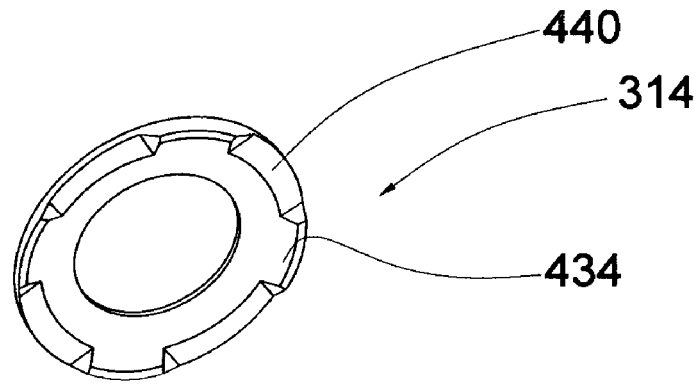
FIG. 39B is a side perspective view of a third type of pressure plate in the shock absorber apparatus.
Figure 39C:
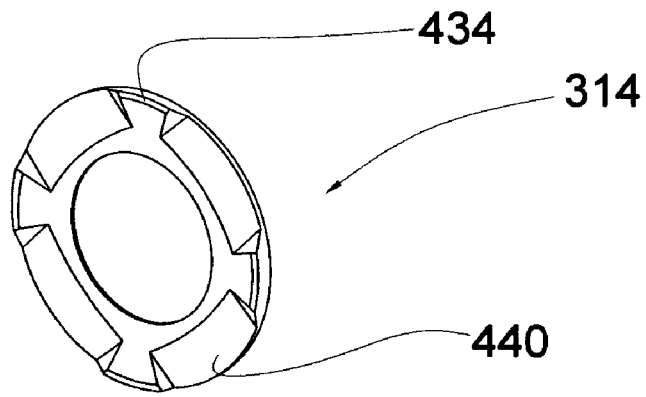
FIG. 39C is a side perspective view of a fourth type of pressure plate in the shock absorber apparatus.

Now referring to FIGS. 39A-C, further variations of pressure plate 314 are shown in each of the figures. In FIG. 39A, a pressure plate 314 has a thickness 322 at the inside edge formed by the aperture 318. The pressure plate 314 has an outer edge as is indicated generally by the numeral 430 and has an outside diameter which he is generally indicated by the numeral 316. A series of ridges or ledges and valleys are shown generally indicated by the numerals 440 and 434. Now referring to FIG. 39B, another variety of the pressure plate 314 is shown with alternating ridges and valleys as generally indicated by the numeral is 434 and 440 respectively. Now referring to FIG. 39C, yet another variation of the pressure plate 314 is shown further having alternating ridges and valleys 434 and 440 respectively. It should be understood, that the number of ridges and valleys in the pressure plate 314 may be changed without altering the scope of the present invention. The ridge or ledge of the pressure plate 134 has a radius 433 formed therein that may be selected to match the natural shape of the plate spring 309 as it is borne by the step washer 308.

The amount of preload force depends upon many factors including the thickness and number of plate springs 309 selected, the difference in thickness between the step washer 308 and the thickness of the ridge or ledge 434 of the pressure plate 314. The plate spring 392 may be composed of a flexible spring-steel metal. The combination of the plate spring 309, step washer 308 and the pressure plate 314 provide a versatile system for providing desirable damping characteristics in the shock absorber apparatus.

Figure 40:
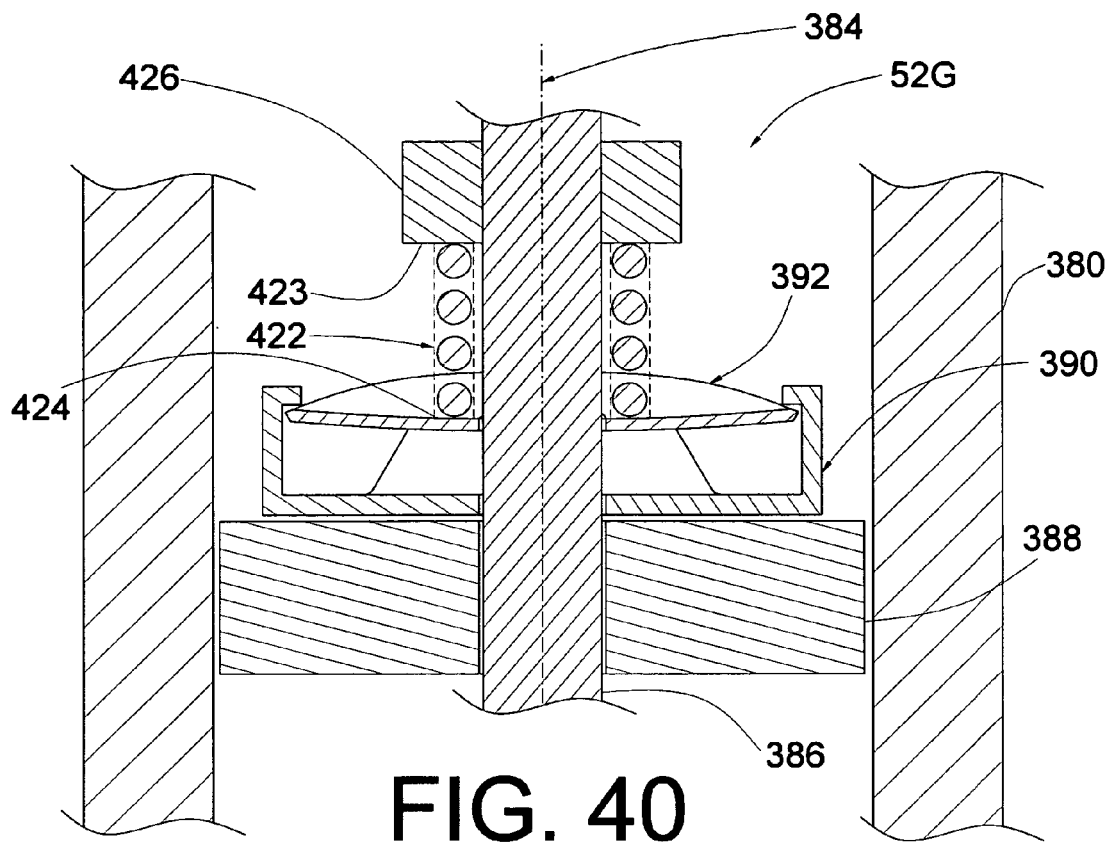
FIG. 40 is a cross sectional view of a third type of progressive fluid control valve.
Figure 41:
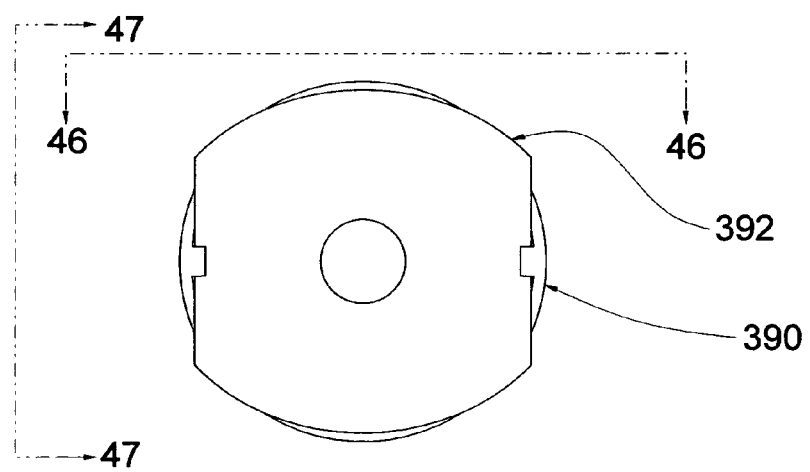
FIG. 41 is a plan view of a pressure plate and plate spring utilized in the third type of progressive fluid control valve.

Now referring to FIG. 40, another version of a dampening valve assembly generally referred to by the designation 52G is shown in a cross-sectional view. A cylinder 380 defines an inner bore in which a piston 388 is concentrically attached to a piston rod 386. A pressure plate 390 is concentrically positioned around the rod 386, and positioned in stacking relation adjacent to the piston 388. A plate spring 392 is retained by the pressure plate 390. A helical spring 422 has a first end 424 and an opposite second end 423. The helical spring 422 is positioned concentrically around the rod 386. The end 424 of the helical spring 424 is borne by the plate spring 392 in flexing relation. The end 423 of the helical spring 422 is borne by a retainer 426. In this arrangement, the pressure plate 392 is slidingly positioned around the rod 386, and is configured to allow fluid to flow through the piston 388 through passages (not shown) when the pressure in the fluid flow acts on the pressure plate in a suitable manner to overcome the preload force of the plate spring 392 and the helical spring 424.

Figure 42:
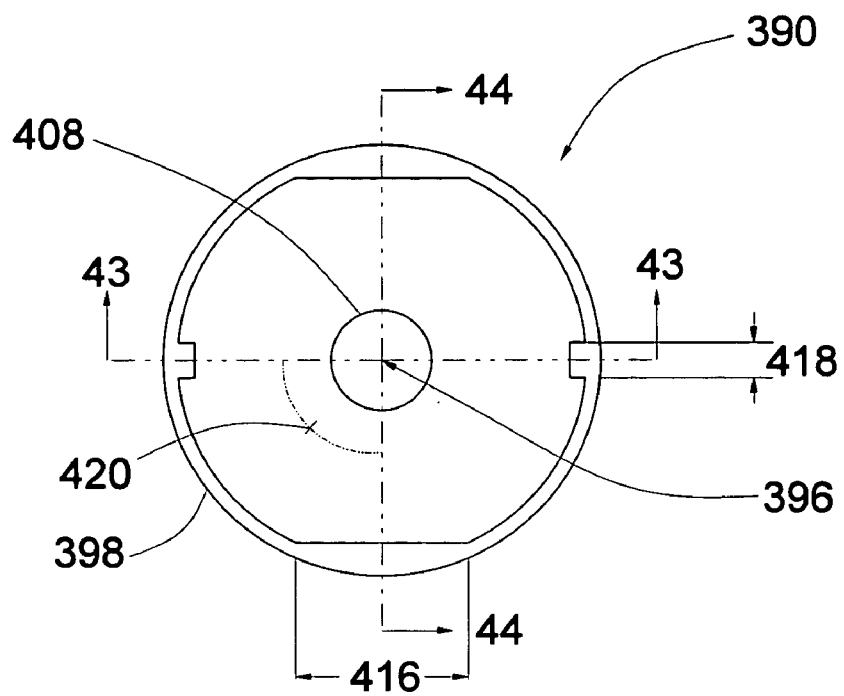
FIG. 42 is a plan view of the pressure plate utilized in the third type of progressive fluid control valve.
Figure 43:
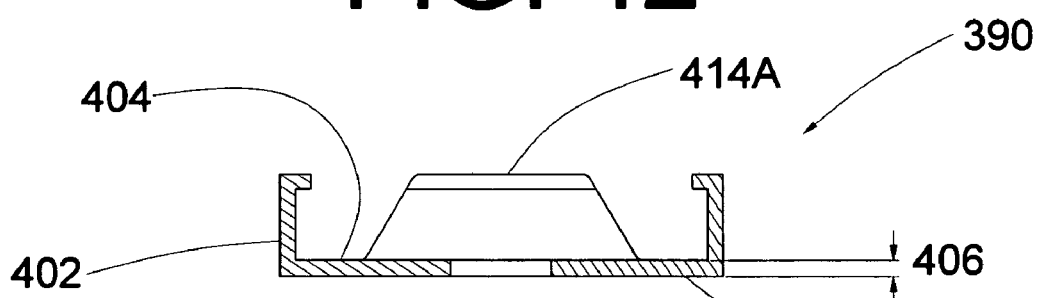
FIG. 43 is cross-sectional view of the pressure plate utilized in the third type of progressive fluid control valve.
Figure 44:
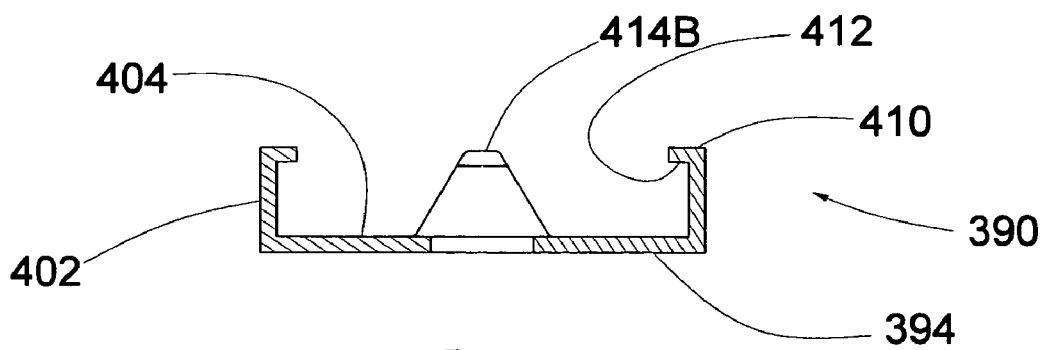
FIG. 44 is an alternate cross-sectional view of the pressure plate utilized in the third type of progressive fluid control valve.
Figure 45:
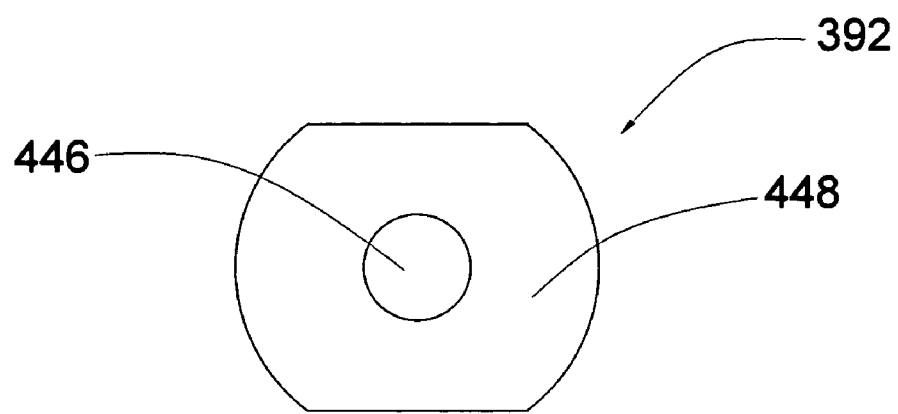
FIG. 45 is a plan view of the plate spring utilized in the third type of progressive fluid control valve.
Figure 46:
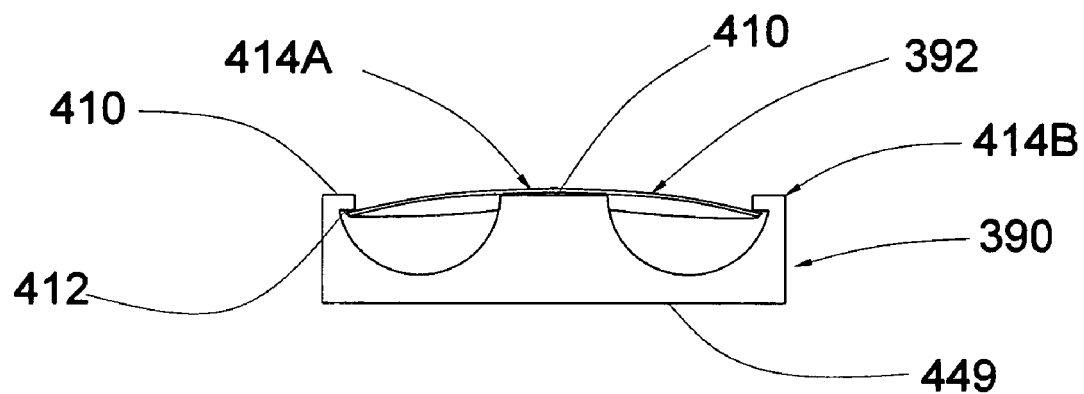
FIG. 46 is an elevation view of one side of the pressure plate and plate spring utilized in the third type of progressive fluid control valve.
Figure 47:
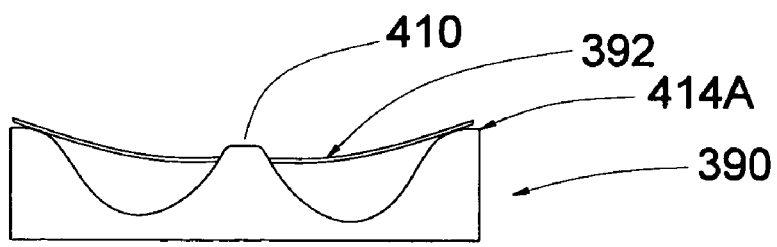
FIG. 47 is an elevation view of an alternate side of the pressure plate and plate spring utilized in the third type of progressive fluid control valve.

Now referring to FIGS. 42, 43, and 44, the pressure plate 390 is shown having a center 396 and an aperture 408. The aperture 408 is configured so that the pressure plate may be positioned around the rod 386 in sliding relation. The pressure plate 390 includes a base surface 394 and an opposite floor surface 404. Further, the pressure plate 390 has rim generally indicated by the numeral 402 extending in a perpendicular direction from the base surface 394. The distance between the planes of the floor surface 404 in the base surface 394 constitute a thickness dimension generally indicated by the numeral 406. A plurality of shelves of a first type 414A and a second type 414B have a first surface 410 an opposite second surface 412. Each shelf, 414A and 414B, has a width dimension generally indicated by the numeral 416 and 418 respectively.

Now referring to FIGS. 41, 45, 46, and 47, the plate spring 392 is shown having an aperture 446 and a flat surface 448. The plate spring 392 is retained by the pressure plate 390 by arranging the spring so that a portion of the plate spring 392 is supported by the top surface 410 of the shelves 414A. The plate spring 392 is retained by the surface 412 of the shelves 414B. In this configuration, the plate spring 392 is retained by the pressure plate 390, and provides a preload force.

The amount of preload depends largely upon the thickness and number of plate springs selected for an application. The preload may also be set by the depth of the step. The Plate spring 392 may be composed of a flexible spring-steel metal. The combination of the plate spring 392 and the pressure plate 390 provides a versatile system that flexes the plate spring 392 in the middle and with a preload to create firmness.

Operation

The operation and of the present invention is believed to be readily apparent and is briefly summarized in the paragraphs which follow.

A shock absorber apparatus 10 including a housing 12 including a first end 18 and a second end 14 opposite the first end 18. The housing 12 has a bore 24. A piston 36 is disposed in the bore 24 proximate the first end 18 and is configured to translate within the bore 24 responsive to external forces. Another piston 38 is disposed in the bore 24 proximate the second end 14 and is configured to translate within the bore 24 responsive to external forces. The piston 36 is coupled to a piston rod 22. The piston rod 22 is partially disposed in the housing 12 proximate the first end 18 and translates into and out of the housing 12. The piston rod 22 includes a mounting element distal from the piston 38 configured to mount to the wheel of a vehicle. The housing 12 includes a mounting element 16 proximate the second end 14 and configured to mount to a vehicle chassis.

An adjuster or response adjustment mechanism 88 is coupled to the housing 12 proximate the second end 14 and is configured to adjust the flow of a damping fluid 370 disposed in the housing 12. The adjuster or mechanism 88 may include modified biasing members having large biasing ranges (e.g., 1500-4000 psi). The adjuster or mechanism 88 can include at least one of a low speed adjustment portion having elements indicated by the boundary 102 (FIG. 9); a mid speed adjustment portion having elements indicated by the boundary 104 (FIG. 9); and a high speed adjustment portion having elements indicated by the boundary 108 (FIG. 10).

The low speed adjustment portion can include a needle flow controller having members 112 and 122 (FIG. 10). The mid speed adjustment portion can include biasing members 140, 156, and 160 (FIG. 10) configured to control damping fluid flow. The high speed adjuster portion can include high resistance biasing members 166, 178, and 182 (FIG. 10) configured to control damping fluid flow. The damping fluid flows through and around the second piston 38 and first piston 36 and optionally may flow through grooves 356 in the housing. The cylinder 12 may have grooves 356 formed along the portion proximate the first piston 36. The grooves 356 enhance the damping fluid flow around the piston 36. The groove 356 may be tapered along the length of the cylinder 12 to allow for a varying groove depth along the length of the groove. The tapered groove can provide a progressive flow area resulting in a progressive dampening effect.

The damping fluid 370 is configured to dampen the translation of the second piston 38 and first piston 36 within the bore 24. A damping valve assembly 52E, 52F, or 52G may be coupled to at least one of the second piston 38 and the first piston 36.

A bottoming needle or needle assembly 98 is adapted to be insertable into a bore 66 in the rod 22 and is configured to control the flow of dampening fluid 370 through or past the piston 38 at a predetermined location in the stroke 342 of the piston 38. The diameter of the first internal bore may be reduced to accommodate a reduced second piston 38 size.

Yet further, the shock absorber apparatus 10 has a first cylinder 12 defining a first internal bore 24 closed by a first end wall 18 and an opposite second end wall 14, and has a first port 94 connected in fluid transmission relation to the first internal bore 24. A second cylinder 81 defining a second internal bore 82 closed by a first end wall 81 and an opposite second end wall 83, and further comprising a second port 92 connected in fluid transmission relation to the second internal bore 79. A response adjustment mechanism 88 is located adjacent to the second cylinder 78, and connected in fluid transmission relation between the first port 94 and second port 92. The response adjustment mechanism 88 further comprises three or more adjustment operators 260, 262, and 264 which are operable to direct the fluid flow between the first port 94 and the second port 92.

The response adjustment mechanism 88 is located in fluid transmission relation between the first port 94 and the second port 92. The first and second pistons, 36 and 38 respectively, translate through the internal bore 24 of the first cylinder or housing 12 in a direction generally indicated by the arrow 344 (FIG. 3), causing a pressure to develop in thee fluid 370 which causes fluid to flow from port 94 through the passage of 90 and into the response adjustment mechanism 88 and out to port 92. This direction of flow is understood as compressive flow when the flow transfers from port 94 to port 92.

The fluid 94 flowing through the passage 90 encounters the third base 202 of the response adjustment mechanism 88 and the second base 182 of the response adjustment mechanism 88. As can best be understood from inspection of FIG. 10, a fluid may enter through a bore or plurality of apertures in the late 236. If this flow of fluid is characterized as being low in volume resulting from a low speed motion of the rod 22, the disc 226 remains in the position shown in FIG. 10 seated against the plate 236. In this low flow situation, the fluid flows through the concentric bore 224 in the plate 236 into the bore 190 in the second base 182 and proceeds through the internal bore 220 of the screw 214 to the stem 112 which has a needle formed on the end 118 which is configured at least partially enter the bore 220 of the screw 214. Therefore, the fluid entering the response adjustment mechanism 88 at a low flow volume may flow out the aperture formed in the shaft 122 as indicated by the numeral 136 (FIG. 12). As the fluid exits the aperture 136 of the shaft 122 its flows through an aperture or a plurality of apertures 199 formed in the housing 198 or alternatively in an alternate version of the third base 202B (FIG. 22B). The fluid exiting the apertures 199 flows through the port 92 and into the chamber 86 causing the piston 80 to translate within the second cylinder 78 and compress the compressible fluid contained in the chamber 84.

Again referring to FIG. 10, the pressure between the port 94 and the port 92 may be considered at a medium pressure when the rod 22 translates in a direction generally indicated by the arrow 344 (FIG. 3) at a medium speed. At the medium pressure, the preload on the spring 224 may be selected so that the force generated on the disc 226 by the medium pressure causes the plate to separate from the plate 236 as will be discussed further below.

As pressure from the fluid encounters the plate 236 positioned in the second base 182, some of the pressure will be transferred to the disc 226 via openings or passages or aperture formed in the plate 236 and designated as 250, 252, 254 and, in 256 (FIG. 20, 21). With sufficient pressure to overcome the preload force of spring 224, as may occur during medium speed events, the disc 226 will separate from the plate 236, thereby allowing a greater volume of fluid to flow. After entering the bore 190 and the cavity 196 of the second base 182, the fluid exerts a pressure upon the first base 160 by transmitting this pressure through a passage formed in the cavity 196 of the second base 182 and leading through the aperture is 183 (FIG. 15) to exert pressure on the surface of the first base 160. When the pressure upon the first base 160 is sufficient to overcome that preload force that is stored by the spring 156, the first base detaches or dislodges from the second base 182 providing a fluid passage whereby fluid flows from the cavity 196 of the second base 186 out through the apertures 183 formed in the of the second base 186, and exits outwardly through the apertures 199 as previously discussed which are positioned in fluid communication with the port 92 allowing the incompressible fluid to flow into the chamber 86 causing the piston 80 to displace and compress the compressible fluid 82 in the chamber 84.

The preload force governing the fluid flow when the speed of the shaft is translating at medium speed in the direction generally indicated by the arrow 344, is adjusted by turning the internal hexagonal recess 152 with an Allen wrench as an adjustable means to modify the preload on the spring 156.

Yet further, in a situation when the rod 22 is translating at a high speed in the direction generally indicated by the arrow 344 in FIG. 3, the pistons 36 and 38 work to increase the pressure of the incompressible fluid proximate to port 94 and through the passage 90. This increased pressure is propagated to the third base 202 and the second base 182. The pressure generated in the fluid during a high speed motion of the rod 22, generate a force on the exposed surface of the second base 182. This force may be sufficient to dislodge the second base 182 from the third base 202 if the force from the fluid is greater than the preload force stored in spring 178. When the force of the fluid is sufficient to overcome the preload force stored in the spring 178, the second base 182 is dislodged from the third base 202, providing an opening that forms a new flow passage that is defined by the surface 184 of the second base 182 and the surface 208 of the third base 202. As may be seen in FIG. 10, the size of this passage is large compared to the other passages in the low and medium speed situations, and allows for a much higher volume a fluid to flow through the response adjuster mechanism 88.

The fluid that flows through the passage formed a between the second base 182 and third base 202 exits through the apertures 199 propagating to the port 92 to enter the chamber 86 which displaces the piston 80 to further compress the gas contained in chamber 84. The amount of preload force required to be overcome by the force generated by the fluid on the second base 182, to provide the passage between the second base 182 and the third base 202 maybe adjusted by rotating shaft 166 using the wrench flats 264 (FIG. 30) to adjust the longitudinal position of the shaft 166 relative to the third base 202.

Now considering the situation where the rod 22 travels in a direction generally indicated by the arrow 347 shown in FIG. 3, thereby causing a returning travel of the Pistons 36 and 38, a return flow of incompressible fluid will travel from port 92 through the as response adjustment mechanism 88 and through the passage 90 through port 94 into the chamber 44. Referring again to FIG. 10, there are to passages for the returning fluid whose operation will now be discussed briefly.

A first passage is notes as the fluid travels from port 92 having a low pressure, the fluid may travel through the apertures 199 into the aperture 136 of the shaft 122 to encounter the stem 112 and the needle portion thereof of the end 118 (FIG. 11). Then depending on the location of the needle portion 118 relative to the bore 220 of the screw 214, a fluid of low pressure will flow through the bore 220 through the screw 214 into the cavity of the second base 182 through the aperture formed in the disc 226 and through the concentric aperture of the plate 236 generally indicated by the numeral 244. The fluid is then the able to travel through the passage 90 to the port 94 and into the chamber 44.

Another fluid passage through the response adjustment mechanism 88 allows fluid to flow from port 92 through passage 90 to port 94 will now be discussed. In this situation, the apertures 201 formed in the third base 202 connect to internal channels or passages which are connected to the aperture 205 (FIG. 24). The fluid flowing from the apertures 205 in the third base 202 may generate a pressure against a washer 266 which is shown in a position blocking the flow from the apertures 205. When the pressure exerted by the fluid contained in the apertures 205 is sufficient to overcome the preload pressure stored by the spring 268, the washer 266 becomes dislodged from the surface 212 of the third base 202 allowing fluid to flow out of the apertures 205 out to the passage 90 to port 94 which is connected to the chamber 44.

Yet further, the shock absorber apparatus 10, has a first cylinder 12 defining a first internal bore 24 has an internal diameter 277, and closed by a first end wall 18, and is further closed by an opposite second end wall 14, and further has a first port 94 connected in fluid transmission relation to the first internal bore 24. A rod 22 has a first end 73 and an opposite second end 64, and wherein the rod 22 movably extends into the first internal bore 24 through an aperture 23 formed in the first end wall 18 so that the second end 64 of the rod is positioned concentrically within the first internal bore 24, and so that the first end of the rod 73 is positioned outside the first internal bore 24. A first piston 36 is fixedly attached to the rod 22 at an intermediate position located between the first and the second end, 73 and 64 respectively, of the rod 22, and positioned concentrically within the first cylinder 12. A second piston 38 is fixedly attached to the rod 22 proximate to the second end 64 of the rod 22, and is positioned concentrically within the first cylinder 12. A second cylinder 78 defines a second internal bore 79 closed by a first end wall 81 and an opposite second end wall 83, and further has a second port 92 connected in fluid transmission relation to the second internal bore 79. A response adjustment mechanism 88 is located adjacent to the second cylinder 78, and is connected in fluid transmission relation between the first cylinder port 94 and the second cylinder port 92, and wherein the response adjustment mechanism 88 is configured to provide three or more adjustments 260, 262, and 264 for tuning the response of the shock absorber system 10.

Furthermore, a shock absorber apparatus 10, has a housing 12 comprising a first internal bore 345 having a diameter 348, and includes a second internal bore 346 having a diameter 350. The housing 12 is closed by a first end wall 354, and further closed by an opposite second end wall 353. A rod 22 has a first end 73 and an opposite second end 64, and wherein the rod movably extends into the first and/or second internal bore 345 and 346 respectively, through an 356 aperture formed in the first end wall 354 so that the second end 64 of the rod 22 is positioned concentrically within the first internal bore 345 or second internal bore 346, so that the first end 73 of the rod 22 is positioned outside the housing 12. A first piston 36 having a diameter 274 is fixedly attached to the rod 22 at an intermediate position located between the first end 73 and the second end 64 of the rod 22, and is positioned within the first internal bore 345 in sliding relation. A second piston 38, having a diameter 279 is fixedly attached to the rod 22 proximate to the second end 64 of the rod 22, and positioned within the first and/or the second internal bore 345 and 346 respectively, in sliding relation. The diameter 274 of the first piston 36 is approximately equal to the diameter 348 of the first internal bore 345, and the diameter 279 of the second piston 38 is approximately equal to the diameter 350 of the second internal bore 346. In addition, the diameter 279 of the second piston 38 is less than the diameter 274 of the first piston 36.

Yet further, the piston rod 22 has a longitudinal axis, and an external surface, and a bore 66 formed concentrically therein. The piston rod 22 has one or more of apertures 366 formed within the piston rod 22 and extending from the external surface of the piston rod 22 into the bore 66 of the piston rod 22 to form a fluid passage. The first piston 36 is configured to translate within the first cylinder bore 345 in response to an external force; a second piston 38 is configured to translate within the first cylinder bore 345, and in the second cylinder bore 346, and in response to the external force. A needle assembly 96 is configured to enter the bore 66 of the piston rod 22 as the second piston 38 nears the second cylinder bore 346.

Yet further, the shock absorber apparatus 10, has a housing 10, and a cylinder bore 24 enclosed by the housing, and further has a longitudinal axis 272. A rod 22 is substantially positioned concentric to, and along, the longitudinal axis 272 of the cylinder bore 24, and is partially positioned within the cylinder bore 24. A piston 388 is fastened to the rod 22, and is slidingly positioned within the cylinder bore 24. A pressure plate 390 is slidingly positioned on the rod 22, and is positioned adjacent to the piston 388. Wherein, the plate spring 392 is retainingly mounted to the pressure plate 390.

And still further, the invention includes, a shock absorber apparatus 10 a cylinder bore 24 enclosed by the housing 12, and having a longitudinal axis 272. A rod 22 having a first end 64 and an opposite second end 73, and wherein the rod 22 is substantially positioned concentric to, and along, the longitudinal axis 272 of the cylinder bore 24, and wherein the first end 64 of the rod 22 is positioned within the cylinder bore 24. A piston 312 is fastened to the rod 22 in stacking relation, and positioned within the cylinder bore 24. A step washer 308 has a first thickness dimension 310, and is positioned on the rod 22 in stacking relation, and positioned proximate to the piston 312. A pressure plate 314 has an outside diameter 316, and has an aperture 339 formed therein, and wherein the pressure plate 314 has an inner edge 320 bounded by the aperture 339, and wherein the inner edge 320 has a second thickness dimension 322, and wherein the pressure plate 314 is positioned around the step washer 308 in sliding relation so that the step washer extends through the aperture 339 of the pressure plate 314. A plate spring 309 has an outer edge 311, and has an aperture 326 formed therein. The plate spring 309 has a first region 328 bounded by the outer edge 311 of the plate spring 309 and extends inwardly by a first distance 330. The plate spring 309 has a second region 329 bounded by the aperture 326 and extends outwardly by a second 332. In operation, a portion of the outer region 328 of the plate spring 309 is borne by the pressure plate 314, and further a portion of the inner region 329 of the plate spring 309 is borne by the step washer 308. In this case, the first thickness dimension 310 is greater than the second thickness dimension 322. Also, the first distance 330 and the second distance 332 are less than the outside diameter 316 of the pressure plate 314 divided by 6.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A shock absorber apparatus, comprising:
   a first cylinder defining a first internal bore closed by a first end wall and an opposite second end wall, and further comprising a first port connected in fluid transmission relation to the first internal bore;
   a second cylinder defining a second internal bore closed by a first end wall and an opposite second end wall, and further comprising a second port connected in fluid transmission relation to the second internal bore; and a response adjustment mechanism located adjacent to the second cylinder, and connected in fluid transmission relation between the first port and second port, comprising first, second, and third adjustment valves, wherein each valve is operable to direct a flow of fluid between the first port and the second port, and wherein the first valve is coaxially positioned within the second valve, and further wherein the second valve is coaxially positioned within the third valve, and wherein the response adjustment mechanism further comprises:

a stem having an outer surface, and a first end, and a second end having a conical shape, and wherein the stem comprises threads formed therein around the outer surface proximate to the second end; and a first shaft located along the longitudinal axis, and having an outer surface, and having a first bore formed therethrough, and wherein the first bore defines an inner surface configured to slideably and telescopingly receive the stem in rotatable relation so that the stem is coaxially received within the first shaft, and further wherein the first shaft comprises a second bore formed therein, and wherein a portion of the inner surface of the second bore has threads formed therein, and is configured to threadably accept the threads formed proximate to the second end of the stem; and wherein a portion of the outer surface of the first shaft has threads formed therein;

a second shaft located along the longitudinal axis having a first end, and an opposite second end, and having an outer surface, and having a bore formed therein, and wherein the bore defines an inner surface, and wherein a portion of the inner surface of the bore has threads formed therein, and is configured to threadably accept the threads formed in the outer surface of the first shaft;

a first spring having a first end and an opposite second end, and positioned around a portion of the outer surface of the first shaft in telescoping relation, and wherein the first end of the first spring is positioned in force transmission relation to the second end of the second shaft;

a first base having a first surface, and an opposite second surface, and having a bore extending from the first surface to the second surface, and wherein the first surface forms a platform for the second end of first spring;

a third shaft located along the longitudinal axis, and having a first and an opposite second end, and having an outer surface, and having a bore formed therein, and wherein the bore defines an inner surface, and wherein a portion of the inner surface of the bore is configured to slideably and telescopingly receive the second shaft in rotatable relation so that the second shaft is coaxially received within the third shaft, and wherein a portion of the outer surface has threads formed therein;

a second spring having a first and an opposite second end, and positioned around a portion of the second shaft in telescoping relation, and further positioned around the first spring in telescoping relation, and wherein the first end of the second spring is positioned in force transmission relation to the second end of the third shaft;

a second base having an outer surface, and having a first and an opposite second surface wherein the outer surface is bound by the first and the second surface, and further having a first bore formed between the first surface and the second surface, and wherein the first surface has a recessed seat formed therein, configured to support the first base in force transmission relation, and further wherein the first surface is configured to support the second spring in force transmission relation, and wherein the second base further comprises a second bore bounded by the first surface, and further comprises a cavity positioned between the first and second surface;

a housing configured to threadably and rotatably accept the third shaft, and wherein the housing has a plurality of apertures formed therein; and a third base having a first and an opposite second surface, and having a first cavity having an inner surface bounded by the first surface, and wherein the inner surface is configured to support the outer surface of the second base in force transmission relation, and further having a second cavity bounded by the second surface.

2. The shock absorber apparatus as claimed in claim 1, and wherein the response adjustment mechanism further comprises:

a screw having a shaft with threads formed therein, and having a first and opposite second end, and having a bore formed therein that extends from the first end through the second end, and having a head formed proximate to the second end, and wherein the shaft of the screw is telescopingly received within the second bore of the second base, and wherein the head of the screw is positioned within the cavity of the second base, and wherein the shaft of the screw extends into the bore of the first shaft in telescopic relation, and wherein the threads of the screw engage the inner threads of the bore of the first shaft, so that the second base is releasably fastened to the first shaft;

a third spring having a first and opposite second end, and configured to be positioned in sliding relation within the second bore of the second base, and further positioned in force transmission relation to the head of the screw;

a disc having a first and an opposite second surface, and having a first bore formed from the second surface to an intermediate position between the first and second surface, and wherein the first concentric bore defines a third surface proximate to the intermediate position, and wherein the disc further comprises a second bore formed therein that extends from the first surface to the third surface, and wherein the second end of the third spring is positioned in force transmission relation to the third surface of the disc; and a plate having a first and an opposite second surface, and a concentric shoulder formed proximate to the second surface, and further having an outer surface extending from the concentric shoulder to the first surface, and a bore extending from the first surface to the second surface, and wherein the outer surface of the plate is positioned in fitting relation to the second bore of the second base, and wherein the concentric shoulder of the plate is borne by the second base.

3. The shock absorber apparatus as claimed in claim 2, and wherein the plate further comprises;

a plurality of apertures, each having a longitudinal axis, and extending from the second surface of the plate; and a plurality of bores, wherein each bore is centered along the longitudinal axis of each aperture, and extending from the first surface of the plate.

4. The shock absorber apparatus as claimed in claim 3, and wherein the first and third springs are each a type of helical spring.

5. The shock absorber apparatus as claimed in claim 4, and wherein the second spring is formed from a plurality of cup springs, configured in stacking relation, one to another.

6. The shock absorber apparatus as claimed in claim 5, and wherein the first end of the stem is further comprised of a notch formed therein to operatively accept a head of a screwdriver; and wherein the first end of the second shaft is formed with a hexagonal recess to operatively accept a head of an allen wrench; and wherein the first end of the third shaft is formed in a hexagonal shape so that it may be engaged by a wrench.

7. The shock absorber apparatus as claimed in claim 2, and wherein the response adjustment mechanism further comprises:
a flat washer positioned adjacent the third surface of the third base; and
a fourth spring having a first and an opposite second end, and wherein the first end of the fourth spring is positioned proximate to the flat washer in force transmission relation, and wherein the second end of the fourth spring is positioned proximate to the second surface of the third base.

8. A shock absorber apparatus, comprising:
a first cylinder defining a first internal bore closed by a first end wall and an opposite second end wall, and further comprising a first port connected in fluid transmission relation to the first internal bore;
a second cylinder defining a second internal bore closed by a first end wall and an opposite second end wall, and further comprising a second port connected in fluid transmission relation to the second internal bore; and
a response adjustment mechanism located adjacent to the second cylinder, and connected in fluid transmission relation between the first port and second port, comprising first, second, and third adjustment valves, wherein each valve is operable to direct a flow of fluid between the first port and the second port, and wherein the first valve is coaxially positioned within the second valve, and further wherein the second valve is coaxially positioned within the third valve, and wherein the first adjustment valve is located along a longitudinal axis, and wherein the second adjustment valve comprises a bore, and is positioned along the longitudinal axis, and configured to telescopingly receive the first adjustment valve in the bore of the second adjustment valve so that the second adjustment valve is positioned in coaxial relation with the first adjustment valve; and further wherein the third adjustment valve further comprises a bore, and is positioned along the longitudinal axis, and configured to telescopingly receive the second adjustment valve in the bore of the third adjustment valve so that the third adjustment valve is positioned in coaxial relation with the second adjustment valve, and wherein the first internal bore of the first cylinder has a diameter and a longitudinal axis, and wherein the shock absorber further comprises:
a rod having a first end and an opposite second end, and wherein the rod movably extends along the longitudinal axis of the first internal bore, and into the first internal bore through an aperture formed in the first end wall of the first cylinder so that the second end of the rod is positioned concentrically within the first internal bore, and so that the first end of the rod is positioned outside the first internal bore;
a first piston having an outside diameter, and fixedly attached to the rod at an intermediate position located between the first and the second end of the rod, and positioned concentrically within the first internal bore of the first cylinder;
a second piston having an outside diameter, and fixedly attached to the piston rod proximate to the second end of the rod, and positioned concentrically within the first internal bore of the first cylinder;
and wherein the outside diameter of the second piston is less than the outside diameter of the first piston.

9. The shock absorber as claimed in claim 8, and further comprising:
a sleeve having an outside diameter and an inside diameter, and wherein the outside diameter of the sleeve is slightly less than the diameter of the first internal bore, and further wherein the inside diameter of the sleeve is slightly greater than the diameter of the second piston, and further wherein the sleeve is fittingly and concentrically positioned within the first internal bore, and proximate to the second end wall of the first cylinder, and proximate to the second piston.

10. The shock absorber as claimed in claim 9, and wherein the rod further comprises a bore having a diameter, and positioned along the longitudinal axis of the first internal bore of the first cylinder, and wherein the shock absorber further comprises:
a needle assembly fastened to the second end wall of the first cylinder so as to extend into the first internal bore, and along the longitudinal axis of the first internal bore of the first cylinder, and wherein the needle assembly is configured to fit within the bore of the rod as the second end of the rod is proximate to the needle assembly.

11. The shock absorber as claimed in claim 10, and wherein the needle assembly further comprises:
a needle member having an outer surface, a first end, and an opposite second end, and comprising a bore extending from the second end of the needle member, and further comprising an end wall located proximate to the first end of the needle member, and further comprising a first aperture formed through the outer surface of the needle member and extending into the bore of the needle member, and at an intermediate location between the first end and the second end of the needle, and further comprising a second aperture formed through the end wall of the needle member and extending into the bore of the needle member, and further wherein the needle member is positioned along the longitudinal axis of the first internal bore, and wherein the second end of the needle member is releasably fastened to the second end wall of the first cylinder;
a sphere positioned within the bore of the needle member;
a spring having a first end and an opposite second end, and positioned within the bore of the needle member, and wherein the second end of the spring is positioned proximate to the second end of the needle member, and wherein the first end of the spring is located proximate to the sphere.

12. The shock absorber as claimed in claim 11, and wherein the first cylinder has an internal surface defined by the first internal bore, and wherein the first cylinder further comprises:
a groove formed into the internal surface of the first cylinder, and so that the groove provides a fluid passage to bypass the flow around the first piston when it is positioned proximate to the first end wall.

13. The shock absorber as claimed in claim 12, and further comprising:
a step washer having a first thickness dimension, and positioned on the rod, and adjacent to the first or second piston, and in stacking relation;

a pressure plate having an outside diameter, and having an aperture formed therein, and wherein the pressure plate has an inner edge bounded by the aperture, and wherein the inner edge has a second thickness dimension, and wherein the pressure plate is positioned around the step washer in sliding relation so that the step washer extends through the aperture of the pressure plate;

a plate spring having an outer edge, and having an aperture formed therein, and wherein the plate spring has a first region bounded by the outer edge of the plate spring and extending inwardly by a first distance, and wherein the plate spring has a second region bounded by the aperture and extending outwardly by a second distance;

and wherein a portion of the outer region of the plate spring is borne by the pressure plate, and wherein a portion of the inner region of the plate spring is borne by the step washer;

and further wherein the first thickness dimension is greater than the second thickness dimension;

and further wherein the first distance and the second distance are less than the outside diameter of the pressure plate divided by 6.

14. The shock absorber as claimed in claim 12, and further comprising:

a shim having an aperture formed therein, and positioned around the rod in stacking relation so that the rod extends through the aperture of the shim, and positioned adjacent to the first or second piston, and in stacking relation;

a step washer having an aperture formed therein, and having a first thickness dimension, and positioned around the rod in stacking relation so that the rod extends through the aperture of the step washer, and positioned adjacent to the shim;

a pressure plate having an outside diameter, and having an aperture formed therein, and wherein the pressure plate has an inner edge bounded by the aperture of the pressure plate, and wherein the inner edge has a second thickness dimension, and wherein the pressure plate is positioned around the step washer in sliding relation so that the step washer extends through the aperture of the pressure plate;

a plate spring having an outer edge, and a center, and having an aperture formed therein, and wherein the plate spring has a first region bounded by the outer edge of the plate spring and extending in an inward direction toward the center by a first distance, and wherein the plate spring has a second region bounded by the aperture and extending in an outward direction relative to the center by a second distance;

and wherein a portion of the outer region of the plate spring is borne by the pressure plate, and wherein a portion of the inner region of the plate spring is borne by the step washer;

and further wherein the first thickness dimension is greater than the second thickness dimension;

and further wherein the first distance and the second distance are less than the outside diameter of the pressure plate divided by 6.

15. A shock absorber apparatus, comprising:

a first cylinder bore having a diameter and having a longitudinal axis, and filled with an incompressible fluid;

a second cylinder bore having a diameter, and filled with the incompressible fluid, and positioned adjacent to the first cylinder bore, and along the longitudinal axis of the first cylinder bore;

a piston rod having a first end, and an opposite second end, and a longitudinal axis, and an external surface, and wherein the first end is positioned outside the first and second cylinder bore, and wherein the second end is positioned within the first or the second cylinder bore, and the longitudinal axis of the piston rod is positioned concentric to, and along, the longitudinal axis of the first cylinder bore, the piston rod further comprising a bore formed concentrically therein, and wherein the piston rod further comprises a one or more of apertures formed within the piston rod and extending from the external surface of the piston rod into the bore of the piston rod to form a fluid passage;

a first piston positioned at an intermediate position located between the first and the second end of the piston rod, and configured to translate within the first cylinder bore in response to an external force;

a second piston positioned proximate to the second end of the piston rod, and configured to translate within the first cylinder bore, and in the second cylinder bore, and in response to the external force;

a needle assembly located substantially within the second cylinder bore, and configured to enter the bore of the piston rod as the second piston nears the second cylinder bore, and wherein the diameter of the second cylinder bore is less than the diameter of the first cylinder bore; and a groove having a first end and an opposite second end, and positioned parallel to the longitudinal axis of the first cylinder bore, and formed within the first cylinder bore, and wherein the groove is positioned in a location proximate to the position of the first piston and configured to allow some of the incompressible fluid to bypass the first piston.

16. The shock absorber apparatus as claimed in claim 15, and further comprising:

a pressurized reservoir containing an incompressible fluid, and a further quantity of the compressible fluid;

a third piston positioned within the pressurized reservoir and configured to form a movable boundary separating the incompressible fluid from the compressible fluid; and a response adjustment mechanism configured to control the flow of the incompressible fluid between the first and the second cylinder bore and the pressurized reservoir comprising first, second, and third adjustment valves, wherein the first valve is coaxially positioned within the second valve, and further wherein the second valve is coaxially positioned within the third valve.

17. The shock absorber apparatus as claimed in claim 16, and wherein the first adjustment valve has a longitudinal axis;

the second adjustment valve comprises an internal bore, and is located along the longitudinal axis, and configured to telescopingly receive the first adjustment valve in the internal bore of the second adjustment valve so that the second adjustment valve is positioned in coaxial relation with the first adjustment valve; and the third adjustment valve further comprising an internal bore, and located along the longitudinal axis, and configured to telescopingly receive the second adjustment valve in the internal bore of the third adjustment valve so that the third adjustment valve is positioned in coaxial relation with the second adjustment valve.

18. A shock absorber apparatus, comprising:

a first cylinder defining a first internal bore closed by a first end wall and an opposite second end wall, and further comprising a first port connected in fluid transmission relation to the first internal bore;

a second cylinder defining a second internal bore closed by a third end wall and an opposite fourth end wall, and further comprising a second port connected in fluid transmission relation to the second internal bore;

a response adjustment mechanism located adjacent to the second cylinder, and connected in fluid transmission relation between the first port and second port, and comprising first, second, and third adjustment valves, and wherein each valve is operable to direct a flow of fluid between the first port and the second port, and wherein the first valve has a stem that is rotatable by a tool during operation, and wherein the second valve has a shaft that is rotatable by a tool during operation, and wherein the third valve has a shaft that is rotatable by a tool during operation.

19. The shock absorber apparatus as claimed in claim 18, and wherein the stem of the first valve has a notch formed therein to operatively accept a screwdriver blade; and wherein a portion of the shaft of the second valve is formed having a hexagonal recess to operatively accept an allen wrench; and wherein a portion of the shaft of the third valve is formed having a hexagonal shape to operatively accept a wrench.

20. The shock absorber apparatus as claimed in claim 8, and wherein the first cylinder has an internal surface defined by the first internal bore, and wherein the first cylinder further comprises a groove formed into the first cylinder through the internal surface, and open to the first internal bore, and oriented substantially parallel to the longitudinal axis of the first inner bore, and configured to allow a fluid to bypass the first piston, and wherein the rod further comprises a bore having a diameter, and positioned substantially concentric within the rod, and further comprising: a needle assembly fastened to the second end wall of the first cylinder so as to extend into the first internal bore, and wherein the needle assembly is configured to fit within the bore of the rod as the second end of the rod is proximate to the needle assembly, and wherein the needle assembly further comprises; a needle member having a longitudinal axis, and having a first end and an opposite second end, and comprising a bore extending along the longitudinal axis of the needle member, and from the first end through the second end, and further comprising a wall located proximate to the fist end, and a first aperture formed in the member and extending into the bore of the needle member, and located at an intermediate location between the first end and the second end of the needle, and further comprising a second aperture formed through the wall and extending into the bore of the needle member, and further wherein the longitudinal axis of the needle member is positioned concentric to, and along, the longitudinal axis of the first internal bore, and wherein the second end is releasably fastened to the second end wall of the first cylinder; a sphere positioned in floating relation within the bore of the needle member; a spring having a first end and an opposite second end, and positioned within the bore of the needle member, and wherein the second end of the spring is positioned proximate to the second end of the needle member, and wherein the first end is proximate to the sphere a sleeve having an outside diameter and an inside diameter, and wherein the outside diameter of the sleeve is approximately equal to the internal diameter of the first internal bore, and further wherein the sleeve is fittingly and concentrically positioned within the first internal bore, and proximate to the second end wall of the first cylinder; and wherein the first piston has an outside diameter, and wherein the second piston has an outside diameter, and wherein the outside diameter of the first piston is approximately equal to the internal diameter of the first internal bore, and wherein the outside diameter of the second piston is approximately equal to the inside diameter of the sleeve.

21. The shock absorber apparatus as claimed in claim 20, and wherein the response adjustment mechanism comprises: a first adjustment valve having a longitudinal axis; a second adjustment valve comprising an internal bore, and located along the longitudinal axis, and configured to telescopingly receive the first adjustment valve in the internal bore of the second adjustment valve so that the second adjustment valve is positioned in coaxial relation with the first adjustment valve; and a third adjustment valve further comprising an internal bore, and located along the longitudinal axis, and configured to telescopingly receive the second adjustment valve in the internal bore of the third adjustment valve so that the third adjustment valve is positioned in coaxial relation with the second adjustment valve.

22. The shock absorber apparatus as claimed in claim 20, and wherein the response adjustment mechanism further comprises: a stem having an outer cylindrical surface, and a first end having a substantially flat shape, and a second end having a conical shape, and wherein the stem comprises threads formed therein around the cylindrical surface proximate to the second end; and a first shaft having a longitudinal axis, and having an outer surface, and having one or more bores formed therein, and wherein each bore defines an inner surface, and wherein a portion of the inner surface of one bore is configured to slideably and telescopingly receive the stem in rotatable relation so that the stem is coaxially received within the first shaft, and further wherein a portion of the inner surface of one bore has threads formed therein, and is configured to threadably accept the threads formed proximate to the second end of the stem; and wherein a portion of the outer surface of the first shaft has threads formed therein; a second shaft having a longitudinal axis, and a first end, and an opposite second end, and having an outer surface, and having one or more bores formed therein and positioned concentric to, and along, the longitudinal axis of the second shaft, and wherein each bore defines an inner surface, and wherein a portion of the inner surface of one bore has internal threads formed therein, and is configured to threadably accept the threads formed in the outer surface of the first shaft; a first spring having a first end and an opposite second end, and positioned around a portion of the outer surface of the first shaft in telescoping relation, and wherein the first end of the first spring is positioned in force transmission relation to the second end of the second shaft; and a first base having a first surface, and an opposite second surface, and having a bore extending from the first surface through the second surface, and wherein the first surface forms a platform for the second end of first spring; and a third shaft having a longitudinal axis, and having a first and an opposite second end, and having an outer surface, and having one or more bores formed therein, and wherein each bore defines an inner surface, and wherein a portion of the inner surface of one bore is configured to slideably and telescopingly receive the second shaft in rotatable relation so that the second shaft is coaxially received within the third shaft, and wherein a portion of the outer surface has threads formed therein; a second spring having a first and an opposite second end, and positioned around a portion of the second shaft in telescoping relation, and further positioned around the first spring in telescoping relation, and wherein the first end of the second spring is positioned in force transmission relation to the second end of the third shaft; a second base having an outer surface, and having a first and an opposite second surface wherein the outer surface is bound by the first and the second surface, and further having a first concentric bore formed therein so that it extends from a first intermediate position between the first surface and the second surface and extends through the second surface, and wherein the first surface has a recessed seat formed therein, and is configured to support the first base in force transmission relation, and further wherein the first surface is configured to support the second spring in force transmission relation, and wherein the second base further comprises a second concentric bore formed therein so it extends from the first surface to second intermediate position located between the first intermediate position and the first surface, and further comprises a concentric cavity that extends from the first intermediate position to the second intermediate position; a housing configured to threadably and rotatably accept the third shaft, and wherein the housing has a plurality of apertures formed therein; and a third base having a first and an opposite second surface, and having a first cavity with an inner surface, wherein the inner surface is bounded by the first surface and extends to an intermediate position between the first and the second surface, and wherein the inner surface is configured to support the outer surface of the second base in force transmission relation, and further having a second cavity extending from the intermediate position to the second surface, and wherein the second cavity defines a third surface positioned proximate to the intermediate position.

23. The shock absorber apparatus as claimed in claim 22, and wherein the response adjustment mechanism further comprises: a screw having a shaft with threads formed therein, and a first and opposite second end, and having a bore formed therein that extends from the first end through the second end, and having a head formed proximate to the second end, and wherein the shaft of the screw is telescopingly received within the second concentric bore of the second base, and wherein the head of the screw is positioned within the cavity of the second base, and wherein the shaft extends into the bore of the first shaft in telescopic relation, and wherein the threads of the screw engage the inner threads of one bore of the first shaft, so that the second base is releasably fastened to the first shaft; a third spring having a first and opposite second end, and configured to be positioned in sliding relation within the second base, and in the second concentric bore and in the cavity of the second base, and further positioned in force transmission relation to the head of the screw; a disc having a first an opposite second surface, and having a first concentric bore formed from the second surface to an intermediate position between the first and second surface, and wherein the first concentric bore defines a third surface proximate to the intermediate position, and wherein the disc further comprises a second concentric bore formed therein and extending from the first surface to the third surface, and wherein the second end of the third spring is positioned in force transmission relation to the third surface of the disc; a plate having a first and an opposite second surface, and concentric shoulder proximate to the second surface, and an outer concentric surface extending from the concentric shoulder to the first surface, and a concentric bore extending therethrough, and wherein the outer concentric surface of the plate is positioned in fitting relation to the second bore of the second base, and wherein the concentric shoulder of the plate is borne by the second base. a flat washer positioned adjacent the third surface of the third base; and a fourth spring having a first and an opposite second end, and wherein the first end of the fourth spring is positioned proximate to the flat washer in force transmission relation, and wherein the second end of the fourth spring is positioned proximate to the second surface of the third base.

24. The shock absorber apparatus as claimed in claim 8, and wherein the first adjustment valve is a type of adjustable needle valve, and wherein the second adjustment valve is a type of an adjustable pressure controlled valve, and wherein the third adjustment valve is a type of an adjustable pressure controlled valve.

25. The shock absorber apparatus as claimed in claim 24, further comprising: a step washer having a first thickness dimension, and positioned on the rod in stacking relation proximate to the first and I or the second piston; a pressure plate having an outside diameter, and having an aperture formed therein, and wherein the pressure plate has an inner edge bounded by the aperture, and wherein the inner edge has a second thickness dimension, and wherein the pressure plate is positioned around the step washer in sliding relation so that the step washer extends through the aperture of the pressure plate; a plate spring having an outer edge, and having an aperture formed therein, and wherein the plate spring has a first region bounded by the outer edge of the plate spring and extending, inwardly by a first distance, and wherein the plate spring has a second region bounded by the aperture and extending outwardly by a second distance; and wherein a portion of the outer region of the plate spring is borne by the pressure plate, and wherein a portion of the inner region of the plate spring is borne by the step washer; and further wherein the first thickness dimension is greater than the second thickness dimension; and further wherein the first distance and the second distance are less than the outside diameter of the pressure plate divided by 6.

* * * * *